United States Patent [19]

Yomdin et al.

[11] Patent Number: 5,410,643
[45] Date of Patent: Apr. 25, 1995

[54] COMPRESSED IMAGE PRODUCTION STORAGE TRANSMISSION AND PROCESSING

[76] Inventors: Yossef Yomdin, Rehov Hanasi Harishon 57/7, Rehovot; Yoram Elihai, Moshav Sgula 67, Doar Na Lachish Zafon; Efraim Paz, Rehov Ha'Nasi 22, Nof Yam Herzliya, all of Israel

[21] Appl. No.: 108,784

[22] Filed: Aug. 18, 1993

Related U.S. Application Data

[63] Continuation of Ser. No. 538,976, Jun. 15, 1990, abandoned.

[30] Foreign Application Priority Data

Jun. 14, 1990 [IL]  Israel ........................................ 94729

[51] Int. Cl.⁶ .............................................. G06F 15/60
[52] U.S. Cl. ...................................................... 395/120
[58] Field of Search .................................. 395/118–120, 395/127, 123, 136, 141, 142, 143, 165, 122

[56]  References Cited

U.S. PATENT DOCUMENTS 4,715,005  12/1987  Heartz ................................. 364/521
4,941,193   7/1990  Barnsley et al. .................... 395/136

FOREIGN PATENT DOCUMENTS 0259971 of 0000  European Pat. Off. .

OTHER PUBLICATIONS

'Mathematics of Physics and Modern Engineering'. Sokolnikoff, 1958, Mc GrawHill Book Company, pp. 143–152.

"Polynomials Representation of Grey-level Images" by Lerner et al. from *Applications of Artificial Intelligence*, Apr., 1988, Orlando, Fla.

*Primary Examiner*—Heather R. Herndon
*Assistant Examiner*—Huynh Ba
*Attorney, Agent, or Firm*—Michael N. Meller

[57]  ABSTRACT

A process for producing a compressed image of a color picture. The color picture is optically scanned to obtain an array of optical parameters representing the basic colors at each coordinate point of the picture which are then converted into digital values. From such digital values, a selection is made of sets of data values representing a series of elements of the picture having discontinuities therein. A model is formulated for each of the elements having a first component containing all of the discontinuities and a second component representing the differentiable content of the elements. The second component is represented by a Taylor polynomial having a selected polynomial degree of at least 2. A maximum allowable error is then selected. The coefficients of the polynomials of the second component are calculated at selected points of a grid with a grid pitch defined by a specified formula. A compressed color picture is derived from the data values constituting the compressed image.

12 Claims, 13 Drawing Sheets

COMPRESSED IMAGE PRODUCTION STORAGE TRANSMISSION AND PROCESSING

This application is a continuation of application Ser. No. 538,976, filed Jun. 15, 1990, now abandoned.

BACKGROUND OF THE INVENTION

This invention relates to a method for producing an image of an object, storing, transmitting and processing the same.

Image means any entity that represents an object exactly, or more or less approximately. The image is the reproduction of a picture. "Intermediate image" means an image that is produced for the purpose of transforming it later into a different image of the same object. When such a transformation occurs, the image finally produced will be called hereinafter "the final image". An image which is to be processed in any way elaborated to produce another image of the same nature, will be called a "temporary image", which, if the processing is a correction or adjustment, is an "unadjusted image".

In a great many technical processes, an image of an object must be produced, and quite often must be stored, transmitted or processed. For instance, it is a common occurrence that two-dimensional figures or pictures be represented by digital data which are stored, processed and transmitted, according to needs. This occurs in word processing by computers, message transmission by telefax, etc.

It is obviously desirable to reduce as much as possible the amount of data defining the image which represents a given object, without distorting the image to the extent that it might cease to represent the corresponding object with an acceptable degree of accuracy. Such a reduction of the required data, or "data compression" or "image compression", as it is sometimes called, serves to simplify, reduce and render more economical the equipment required for the storage of an image, its processing and transmission. For instance, it is well known that in modern technology, transmission lines, including frequency bands available for radio transmission, are increasingly overcrowded, and every effort is being made to exploit them as fully as possible, one of the means for so exploiting them being to reduce the amount of data that are sent through a given transmission line in order to convey a given amount of information.

It is a general purpose of this invention to provide a method for producing the image of an object, storing it, processing and transmitting it, while minimizing the amount of data that are required for carrying out the said operations.

More specific objects of the invention and specific applications thereof, will become apparent as the description proceeds.

BRIEF SUMMARY OF THE INVENTION

The following considerations are preliminary to an understanding of the process according to the invention. The process according to the invention will be described with a reference to an object which may be broken up into a number of plane lines, corresponding to functions of one variable.

In one of its simplest forms, the object, an image of which is to be constructed, may be a plane line. The object lines, as any other object, may be defined in many different ways, but, for the purposes of illustration only, it will be treated as defined by a graph or by a corresponding function, it being evident that the information conveyed by a graph can be conveyed in other suitable ways. In any case, in order to carry out the process according to the invention, the object line must be translated into digital values or into a computer program or subroutine or an analogical process or into the structure of a special purpose digital or analogical computer, which can be entered and memorized in an elaborator, and which define couples of values x, y or each point of the line. The object line may be considered in its entirety, or, more frequently, it will be divided into segments, to each of which the process of the invention will be separately applied. Therefore, if the line has been so divided, the expression "object line", when used hereinafter, must be construed as meaning the particular segment under consideration at the moment.

The process, then, comprises, in a restrictive definition, the following steps:

(1) Approximating a line by a model which includes at least one differentiable component.

2) Establishing the maximum allowable error $\epsilon$ and the degree k of the Taylor polynomials by which the differentiable component(s) of the model are to be approximated.

(3) Establishing at least a pitch grid h and constructing a grid each region of which has one of said pitches h.

(4) Computing the coefficients of the Taylor polynomials of the aforesaid differentiable component or components at selected points of said grid.

Two or more of the aforesaid steps may be carried out concurrently, in whole or in part, or divided into successive stages, which may be intercalated to a greater or a lesser extent.

Further operations, hereinafter described, may be carried out and are often desirable to minimize the effect of inaccuracies in the said coefficients, for rounding them off, for taking into account different scales which may be present in the data, and for obtaining, if desired, an image which has the same nature as the object. "Non-differentiable component" means herein a component comprising one or more points at which it is not differentiable, or, a component that is not differentiable at all its points.

The process according to the invention can be extended to objects that are more complex than plane lines by simple generalizations, as will be explained hereinafter.

BRIEF DESCRIPTION OF THE DRAWINGS

The invention will be better understood from the following description of preferred embodiments, with reference to the appended drawings, where.

DETAILED DESCRIPTION OF PREFERRED EMBODIMENTS

The process steps hereinbefore defined will now be more fully explained.

Step (1)—The object line, the data defining which have been physically stored e.g. in an electronic memory, is approximated by a model, preferably defined in the same way as the object line, which model preferably consists of at least a first component embodying the characteristics of the object, if any, which render it non-differentiable at some points or regions—it being of course possible to omit said first component if there are no significant characteristics of non-differentiability of the object—and at least a second component which embodies all the differentiable content of the object.

Figure 1A:
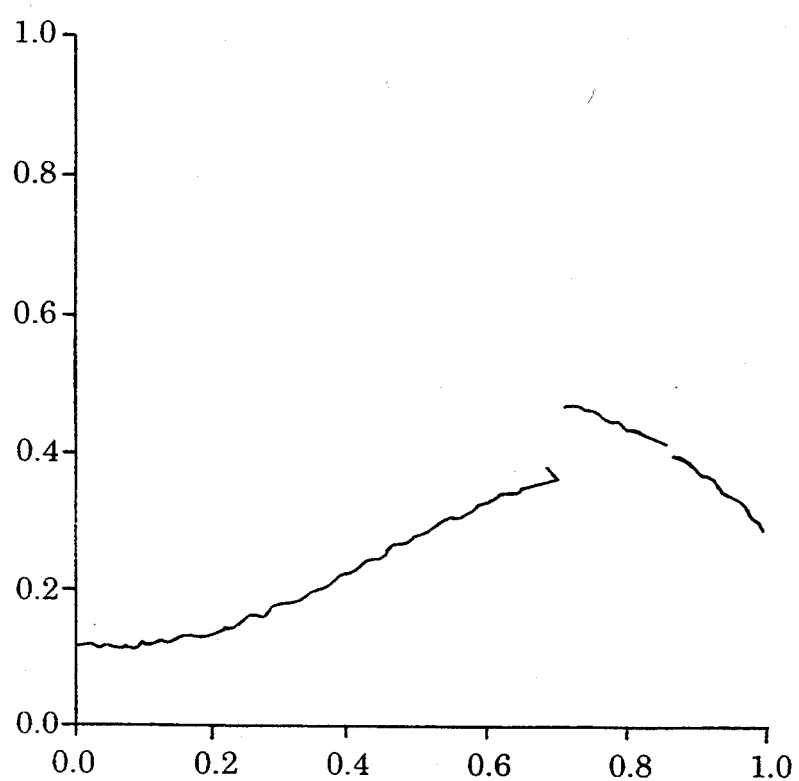
FIGS. 1a and 1b illustrate an example of an object line and its image, respectively.
Figure 1B:
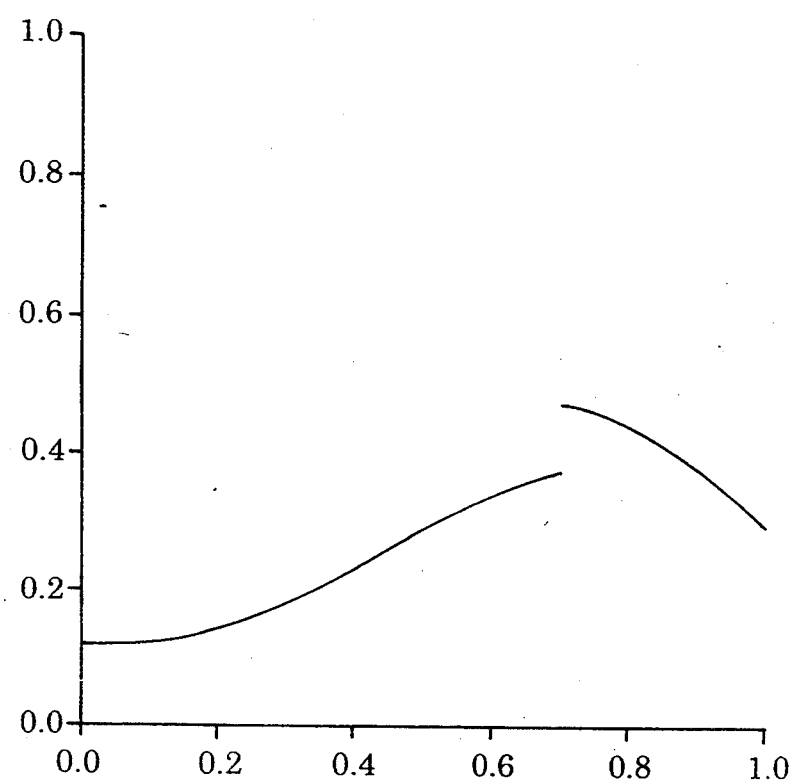

Typical cases of models are the following:

Case a) The first component is a base line, which is a simple—desirably, the simplest—line having qualitatively the same discontinuities as the object line, and the second components is a curve which represents the deviations therefrom of the object line, and which will be differentiable and can be called interpolating function. The base line may be constructed in each individual instance, or, more conveniently, may be chosen, according to the actual discontinuities of the object line, from a number of normal forms, which are the simplest functions having the required discontinuities. The following standard form of model can be used in this case:

$$\Phi(x) = Hx_o, a, b, c, d(x) + \phi(x) \qquad (1)$$

wherein H is a normal form defined by $H(x) = a(x - x_o) + b$, if $x \geq x_o$ or $H(x) = c(x - x_o) + d$, if x is less than $x_o$. The values of the parameters $x_o, a, b, c, d$ are determined, in a preferred embodiment of the invention, by minimizing a quantity representing an error, e.g. the quadratical error, as hereinafter set forth. The base line can be predetermined, or chose, in general according to predetermined criteria, from a list prepared in advance, or it can be chosen in each case by the operator. This case is illustrated at FIG. 1a, 1b showing respectively an object line and its model.

Case b) The model is a differentiable function of another function which embodies the non-differentiable characteristics, viz the discontinuities, of the object line. It can be epressed as:

$$\Phi(x) = \Phi'[\phi(x)], \qquad (2)$$

wherein $\phi$ is the first component, which will be called the base curve, and $\Phi'$ is the second component. $\phi(x)$ can be looked at as defining a change of coordinates: in the differentiable component $\Phi'$, the ordinates are referred to abscissae which are not x, but $\phi(x)$.

Case c) This case will be mentioned here, though it is not applicable to a line, but only to surfaces in a space having three or more dimensions. In the case of three dimensions, a coordinate (say, the elevation) z of a surface, is a function $z_1$ in a certain region of the plane x-y of the two remaining coordinates and is another function $z_2$ in another region thereof, the two regions being separated by a border line defined e.g. by a relationship $y = \phi(x)$. Then the model $\phi(z, y)$ consists of the function $z_1$ if y is greater than $\phi(x)$, and $z_2$ if y is smaller than $\phi(x)$, one or the other of the $z_1$ and $z_2$ applying when $y = \phi(x)$.

Case d) The object line is differentiable at all points, and the model consists only of a differentiable component.

In a form of the invention, all the parameters of the model the values of which have to be chosen, are determined by minimizing a quantity representing an error—e.g. The quadratical error, viz. $\Sigma[f(x_i) - \Phi(x_i)]^2$—the minimization being carried out by means of a predetermined subroutine with respect to all the parameters of the model $\Phi$, for the function f(x) representing the object, the values of f(x) for each x being determined by known subroutines. Programs for this purpose are available, e.g. from the ILSM library.

Step (2)
a)—The maximum allowable error $\epsilon$, which is to be tolerated in approximating the object line, viz. which expresses the desired precision of the image, is established.
b)—The degree k of the Taylor polynomials, which will be used to approximate the differentiable component or interpolating curve, is established.

Step (3)—The grid need not be cartesian and its coordinate lines may be curved, although for simplicity's sake a cartesian grid will always be illustrated herein. The grid may be divided into different regions having different grid pitches or even different types of coordinate lines. The grid pitch h (viz., the distance between adjacent coordinate lines which define the grid cells) is selected according to the precision desired of the image, and may be different in different parts of the regions, although a regular grid will often be preferred.

In an embodiment of the invention, h is calculated, by a suitable subroutine, from the formula $$CMh^{k+1} \leq \epsilon \qquad (3)$$

wherein $C = 1/(k+1)!$ and M is the maximum, at each grid point, of the absolute value of the (partial, in the case of an object which is a function of more than one variable) derivatives of degree $k+1$ of the differentiable component or components, in the segment or zone of the object under consideration, M being determined by using a known subroutine which computes the derivatives of order $k+1$, produced e.g. by a package such as MAXIMA OR MATHEMATICA.

Step (4)—The nodes of the grid are taken as base points, and a (known e.g. a MAXIMA) subroutine is applied at each base point to compute the Taylor polynomials of degree k of the interpolating curve.

At this stage, the following data have been obtained:
A) The coefficients of the Taylor polynomials of the differentiable component or components of the model;
B) The number or other identification or analytical definition of the non-differentiable component(s), if any, of the model, such as the base line or the base curve;
C) The values of the parameters of the said non-differentiable component(s), if any;

and these define an image, which will usually be an intermediate image, but could be a final one, according to cases. Hereinafter it will be assumed that it is an intermediate image, from which the final image, in the same form as the original object, is to be constructed; however this is done merely for the sake of simplicity and involves no limitation.

In many cases, as will be explained below, the image thus obtained may require further elaboration without changing its nature, viz. while remaining a set of data of the same kind, and it will be only a temporary, in particular an unadjusted image. Then some or all of the steps from (5) on will be carried out.

Figure 2A:
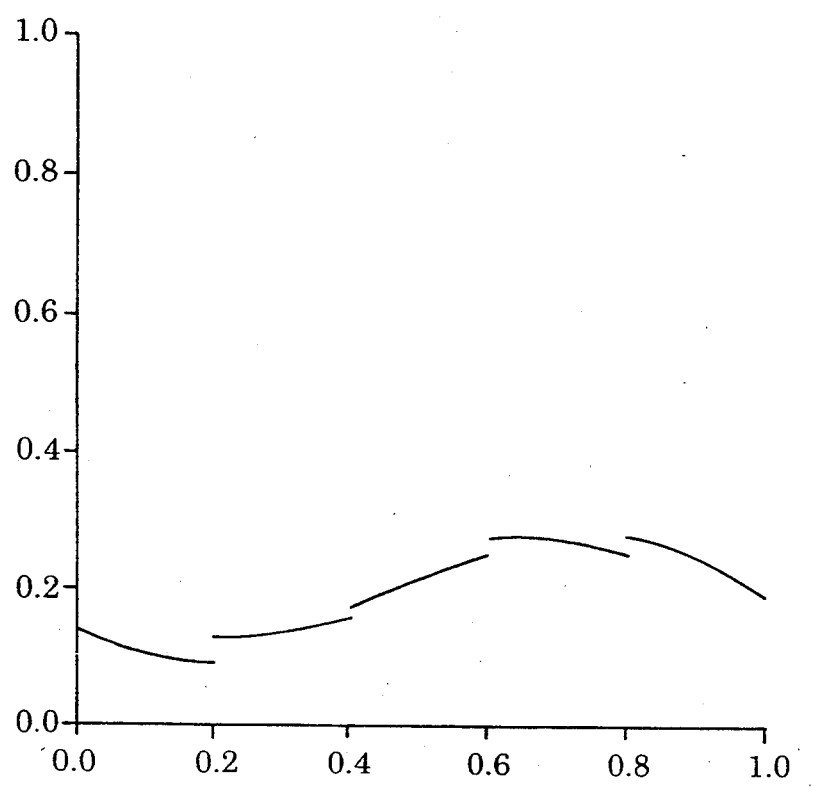
FIGS. 2a and 2b illustrate a temporary image line the segments of which do not match at meeting points, and a corresponding adjusted image line, respectively.

Step (5)—In the case of the presence of so-called noise or inaccuracies in said temporary image line, or if the numerical noise, viz. the inaccuracies of the computations, which are large in comparison with the accuracy required, the Taylor polynomials which make up the temporary image line or its differentiable component may disagree at their meeting points by more than allowed by the required accuracy, as represented, by way of example, in FIG. 2a.

In this case, an adjusted image line is constructed by applying to each differentiable component a subroutine, hereinafter referred to as "Whitney subroutine", which computes W, wherein W is a quantity representing the discrepancies of the Taylor polynomials. In particular, W can be given by a formula:

$$W = \Sigma_{ij} \| p_i - (p_j)_i \|^2 \qquad (3)$$

Here the sum is taken over all the adjacent grid points i, j (possibly belonging to different segments of the image). $p_i$, $p_j$ denote the Taylor polynomials, obtained in steps (1)-(4) at the grid points i, j, and $(p_j)_i$ denotes the polynomial $P_j$, expressed in coordinates, centered at the i-th grid point. $\| p - q \|^2$ denotes, for any two polynomials p and q of the same degree and number of variables, the sum of squares of the differences of corresponding coefficients.

Figure 2B:
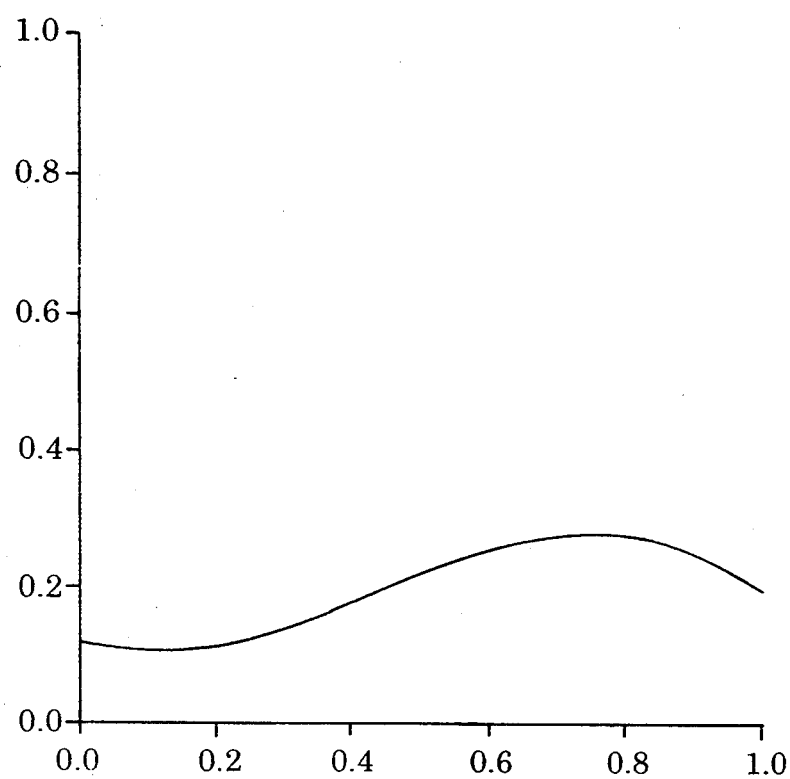

For any values of the coefficients of $p_i$, W is computed by using known subroutines, produced e.g. by a package such as MATHEMATICA. W is then minimized (e.g. by standard gradient methods), using, as starting values of the coefficient of the Taylor polynomials, those obtained by the previous steps, and under such constraints that the result of the minimization do not deviate from the initial data by more than the allowed error, e.g. under the condition that the zero degree coefficients of said polynomials remain unchanged. An adjusted image line, corresponding to the unadjusted image line of FIG. 2a, is illustrated by way of example in FIG. 2b.

Step (6)—If the accuracy of the adjusted coefficients of the Taylor polynomials obtained from step (5) is excessive with respect to that desired in the final image, they are rounded off to a maximum allowable error $\epsilon'$ by any suitable method (not necessarily the same for coefficients of different degrees). The data thus obtained represent the adjusted image line.

Step (7)—Sometimes the data of the object to be represented may require the use of different grid resolutions, or such use may be desirable. An example which clarifies this case is the following.

Let us assume that the object represents a periodic phenomenon, e.g. an oscillatory phenomenon such as an oscillating electrical impulse or an electromagnetic wave. Such a phenomenon can be analyzed and is usually represented by the combination of two or more superimposed components, specifically, a relatively low frequency carrier wave and a higher frequency modulating wave. The modulation can be sometimes considered as resulting from a first, intermediate frequency modulation, and one or more high frequency modulation or modulations, and in this case the object will have three or more components. The image can be conveniently constructed from images of the various components, e.g. of the carrier wave and of the modulating wave or waves, and obviously the lower frequencies will require lower resolutions and larger grid pitches will be suitable for them. Likewise, the frequency of an oscillatory phenomenon may vary at different times or in different spatial regions and its components will not be superimposed, but separated in space. Similar situations may occur in various cases. Generally, many kinds of objects may comprise superimposed or separated components which have details of different fineness, which require different degrees of resolution. Sine oscillatory phenomena are a typical case of objects requiring different grid resolutions, the word "frequency" will be used to indicate the fineness of the required grid, but this is not to be taken as a limitation, since the same procedure can be applied to non-oscillatory phenomena.

In such cases, the following procedure is preferably followed:

a) Steps 1 to 6 (or such among them which are necessary in the specific case) are carried out and a first temporary image is obtained.

b) A new maximum error $\epsilon_2$, bigger than $\epsilon$ (or $\epsilon'$, as the case may be) is chosen.

c) A grid which is sparser than the one used for carrying out the steps under a), and the pitch of which is determined by the resolution required by the lowest frequency of the components existing in the object (e.g. that of a carrier wave) is established.

d) Steps 1 to 6 are repeated using $\epsilon_2$ and the sparser grid and a second temporary image is obtained.

e) The second temporary image thus obtained is substracted from the first and a first residual image is obtained, which contains only data relating to higher frequency components of the object.

f) The same procedure—steps b) to e)—is repeated for successively higher frequencies of components, correspondingly obtaining successive residual images increasingly restricted to higher frequency components.

As a result, coefficients of Taylor polynomials are obtained on several grids having increasingly higher resolutions, viz. smaller pitches, separately corresponding to the object components required increasingly higher resolutions.

The data obtained after steps (1) to (4) and those among (5), (6), (7), which it has been found necessary to perform, constitute an intermediate image or sometimes a final one. Usually these are the compressed data which can be stored, transmitted and processed.

If a further compression is desirable, one of the standard methods of encoding coefficients (e.g. Hoffman coding) can be applied. If necessary, the resulting string of data can be further compressed by one of the standard methods of unstructured data compression (e.g. entropy compression). However, this last step reduces the possibility of a compressed data processing.

If a final image, which has the same nature as the object, is to be constructed, the following procedure is followed:

Step (8)

a) The Taylor polynomial coefficients obtained after completion of steps (1) to (4) and of those among steps (5) and (6) which it has been found necessary to perform, are treated as if they represented an unadjusted temporary image, which is affected by noise, and are subjected once more to step (5), using them as starting data.

b) The domain in which the temporary image has been defined is divided into regions by means of a grid, each region being a portion of the grid around a grid node or base point. These regions may overlap.

c) A curve or curves representing the Taylor polynomials of degree k in the above regions are constructed from the coefficients defining the temporary image—e.g. obtained as in step (8) a)—at each node of the grid or of that grid having the highest resolution (smallest pitch), if there is more than one grid (particularly if step (7) has been carried out), using a known subroutine.

Said curve or curves constitute the final image of the object line. The Aforementioned curves may diverge at the meeting points of the regions mentioned above under b) (or on their overlapping parts.) If this disagreement does not exceed the allowable error $\epsilon$, any of the overlapping curves can be used at the meeting points on the overlapping parts of the above regions.

If as the result of the noise of the data or the computational noise, the above discrepancies are large in comparison with the accuracy required, average values can be used on the overlapping parts. This is done by averaging the values of the overlapping curves with the appropriate weights.

Actually, other polynomials or functions could be used for approximation purposes, such as Tchebicheff polynomials, trigonometric exponential functions, etc., without departing from the invention, but Taylor polynomials are preferred.

The above described process applies, with obvious generalization, to a wide range of objects. Some examples follow.

I—A surface in a three-dimensional space corresponds to a function of two variables. If the surface is defined in a space that has more than three, say, $n+1$ dimensions, the independent variables will be more than two, say, n $(x_1, x_2, \ldots x_n)$, but the operations to be carried out will be essentially the same, and the necessary generalizations will be obvious to skilled persons. In any case, any surface can be translated, as well as a line, to digital values, which can be entered and stored. The model will be constructed in the same way as for a line. Case c) of model construction, already described, applied to surfaces in any space. Analogously to case a), a model may consists of a simple base surface, which presents the discontinuities of the object, surface, and by a differentiable or interpolating surface, which represents the deviations of the object from the base surface. One can also operate analogously to case b), by using functions of more than one variable. The minimization of the quadratical error is effected in the same way as in the case of an object line, using values of $\Phi_{ij \ldots n}$ and $f(x_i, x_j, \ldots, x_n)$ which depend on n variables. The remaining steps are likewise adapted to the existence of n variables. All derivatives, of course, will be partial derivatives. The construction of the final image from the temporary image—step (8)—can likewise be carried out with obvious generalizations in the case of images defined in a space having any number of dimensions.

II—A surface can be considered as a family of lines, which are obtained by the intersection of the surface with a family of planes, e.g. vertical planes the orientation of which is taken as that of the x-axis, identified by a parameter, e.g. their y coordinate. A family of curves in a plane, depending on one parameter, as may result from the representation of any number of phenomena, is obviously equivalent to that of a surface and may be treated as such, or vice versa.

III—A particular case of an object which is a surface is, e.g., a terrain, wherein the surface is defined by the elevation as a function of two plane (cartesian or polar) coordinates.

IV—A building can be represented in the same way, if it is very simple. If its shape is complex, however, it must be broken up into a number of component parts. However, if it is desired to represent it as it is seen from the outside, say by an observer which can place himself at any vantage point within a certain distance from the building, the observer's position can be identified by three coordinates, x, y and z (or polar coordinates), or by two, if it assumed that the observer's eye is at a given level. From each position of the observer point it is possible, if the configuration of the terrain is known, to determine the distance D on each line of sight from the observer's eye to the building surface, and this will determine how the building is seen. Each line of sight can be identified by two coordinates: e.g. its inclination (the angle thereof with the vertical in a vertical plane which contains it), and its azimuth (the angle of said vertical plane with a reference vertical plane, e.g. one that contains the geographic or magnetic north). The way in which the building appears to be observer, is therefore defined by a function D of five variables, viz. by a surface in a six-dimensional space.

V—A family of curves in a plane, depending on more than one parameter, is obviously equivalent to a surface in a space having more than three dimensions.

VI—If in example IV above the coordinates of the observer are known as a function of a single variable, say, when he approaches the building along a given line, in which case the variable is the distance covered from a starting point, or in motion, as in a vehicle, along a given line, in which case the variable is time. In this case the variables of the surface become three (e.g. distance or time and inclination and azimuth) and the space is only four-dimensional, but the four-dimensional surface is subject to the constraint represented by the definition of the observer's motion. In general, in many cases, the degree of the space in which the surface is defined may be reduced by the introduction of suitable constraints.

VII—The final image of a colour picture is another colour picture, that is not identical, but sufficiently similar to the object picture. The object picture can be scanned by known apparatus (scanners), by means of white light, and for each point the intensity of the three basic colours (magenta, cyan and yellow) may be measured and registered. The object is thus reduced to three partial or component objects, each consisting of the distribution of one basic colour over the picture and having a physical reality, as it is equivalent to the colour picture that would be contained by exposing the original through three filters, having colours complementary to the three basic colours, or, in practice, to an array of digital data representing such one-coloured picture. Each of said partial objects can be subjected to the process of the invention, to produce a reduced or compressed array of data, constituting a partial image, and the partial images can be transformed into a combined final image approximating the original object, by processes known to those skilled in the art. If the partial images must be stored and/or transmitted, the process of the invention will facilitate doing this and render it more economical. In the same way a dynamic coloured picture, such as a movie or a TV broadcast, can be reduced to a final dynamic image.

A particular advantage and a preferred aspect of the invention consists in the possibility of processing the compressed intermediate image obtained as set forth hereinbefore and producing from it a processed final image, which does not represent the object but represents what would have been the result of processing the object. The processed intermediate image can be stored and transmitted with the already mentioned savings and advantages inherent in the reduction of the number of data, but said reduction is even more advantageous in the processing, for it is obviously more convenient to process a reduced instead of a larger amount of data. Said processing in a compressed form, as it may be called, is made possible by the following property:

Let F be an operator which is analytic in nature, viz. can be defined by mathematical relationships. Let O be an object of any nature, but which can be represented by Taylor polynomials $p_i$. Then by applying operator F to the $p_i$'s, one obtains polynomials which represent the object that would be obtained by applying the operator F to the object O. If one uses the symbol $\simeq$ to indicate that an array of polynomials represents an object, one can write:

if $p_i \simeq O$, then $F(p_i) \simeq F(O)$.

Elementary examples of analytic operators are algebraic operations, rotations of geometrical figures, changes of coordinates in general, etc. These operators are represented by mathematical operations. If F(O) is to be constructed, such operations must be carried out on all the data, e.g. digital data, which define the object. But of a compressed image has been obtained as set forth above, and an array of Taylor polynomial coefficients has been obtained, which are in a much smaller number than the said digital data, said mathematical operations can be carried out on said coefficients, and a processed intermediate image will be obtained, which represents F(O) and from which F(O) can be constructed as set forth in step (9) above.

The following examples illustrate a number of embodiments of the invention.

EXAMPLE 1

An object line f in the plane (x, y) is given by an array $A = (y_0, y_1, \ldots, y_{100})$, where $y_i = f(x_i)$, $x_i = i/100$, $i = 0, 1, \ldots, 100$. In this specific example the array (array 1) is the following:

| | | | | | | | | |
|---|---|---|---|---|---|---|---|---|
| 0.1152 | 0.1155 | 0.1191 | 0.1131 | 0.1174 | 0.1133 | 0.1108 | 0.1149 | 0.1105 |
| 0.1182 | 0.1167 | 0.1206 | 0.1238 | 0.1196 | 0.1264 | 0.1282 | 0.1313 | 0.1315 |
| 0.1299 | 0.1330 | 0.1366 | 0.1409 | 0.1402 | 0.1462 | 0.1569 | 0.1608 | 0.1631 |
| 0.1604 | 0.1693 | 0.1779 | 0.1797 | 0.1826 | 0.1826 | 0.1888 | 0.1963 | 0.2011 |
| 0.2034 | 0.2084 | 0.2170 | 0.2244 | 0.2265 | 0.2327 | 0.2429 | 0.2468 | 0.2472 |
| 0.2523 | 0.2661 | 0.2673 | 0.2702 | 0.2796 | 0.2811 | 0.2845 | 0.2949 | 0.3022 |
| 0.3078 | 0.3049 | 0.3121 | 0.3157 | 0.3256 | 0.3270 | 0.3346 | 0.3413 | 0.3405 |
| 0.3428 | 0.3503 | 0.3513 | 0.3530 | 0.3571 | 0.3675 | 0.3616 | 0.4648 | 0.4665 |
| 0.4659 | 0.4607 | 0.4600 | 0.4536 | 0.4473 | 0.4441 | 0.4427 | 0.4330 | 0.4329 |
| 0.4268 | 0.4243 | 0.4185 | 0.4135 | 0.4107 | 0.3961 | 0.3925 | 0.3877 | 0.3774 |
| 0.3698 | 0.3671 | 0.3583 | 0.3449 | 0.3397 | 0.3338 | 0.3271 | 0.3091 | 0.3031 |
| 0.2929 | | | | | | | | |

Figure 3A:
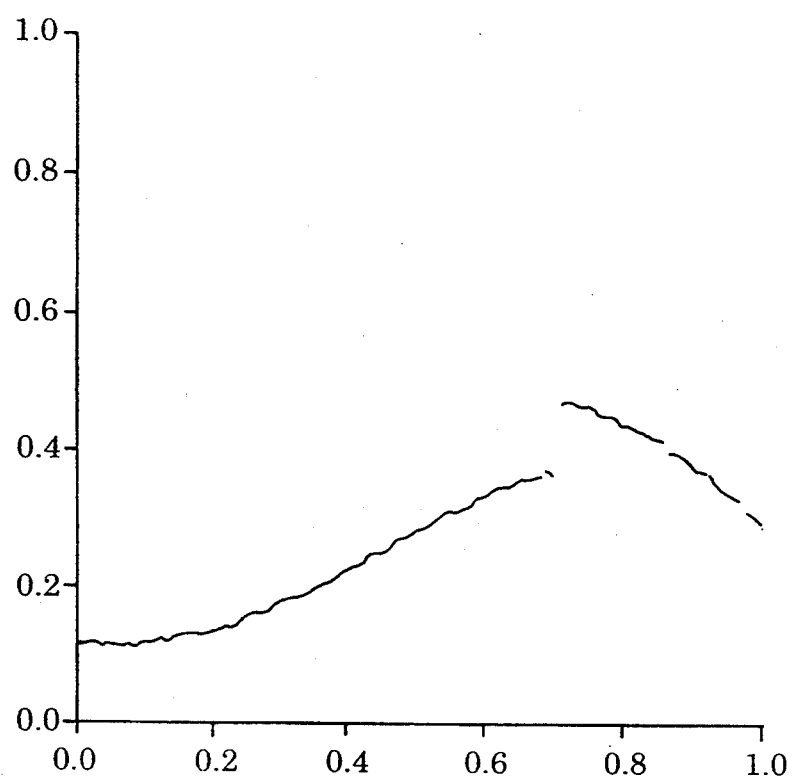
FIGS. 3a, 3b, 3c, and 3d illustrate respectively an object line and the corresponding model line, final image and non-differentiable component of the model, with reference to Example 1.

An object line itself is shown in FIG. 3a. The required accuracy of representing this line is 0.035. The compressed image of this line is produced as follows.

Firstly it is subdivided into three segments lying over the segments [0.0, 0.6], [0.6, 0.8], [0.8, 1.0] in the x-axis. The following model is chosen on the segments [0.0, 0.6] and [0.8, 1.0]:

$y = Q(x) = c_1 \sin(\omega_1 x + \phi_1) + c_2 \cos(\omega_2 x + \phi_2) + c_3 x^2 + c_4 x + c_5$ with $c_1, c_2, \omega_1, \omega_2, \phi_1, \phi_2, c_3, c_4, c_5$-the parameters.

On the segment [0.6, 0.8] the following model is chosen:

$y = Q(x) + Hx_0, a, b, c, d(x)$, where $Q(x)$ is as above, and the normal form H is defined by $H(x) = a(x - x_0) + b$, if $x \geq x_0$ or $H(x) = c(x - x_0) + d$, if x is less than $x_0$. Said normal form is illustrated in FIG. 3d. Approximation on each segment is carried out by minimization, with respect to the corresponding parameters, of the quadratic error:

$\Sigma(y_i - Q(x_i))^2$ ($\Sigma(y_i - Q(x_i) - H(x_i))^2$ on [0.6, 0.8]).

The values of the parameters found are given in the following array 2.

Figure 3B:
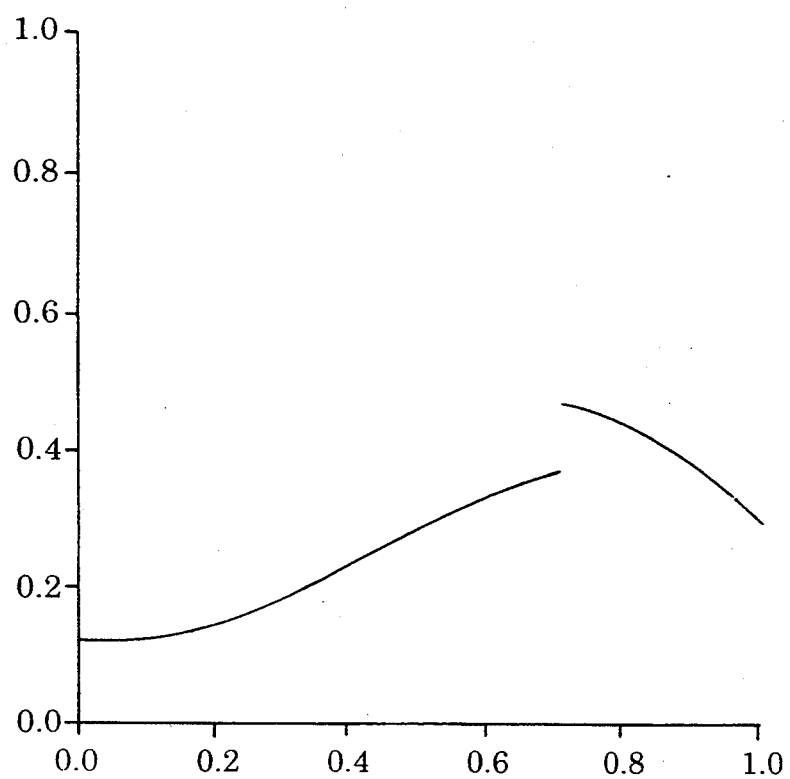

$Q(x) = 2.0 + 0.1^*x - 0.2^*x^*x - 0.15^*\cos(-0.4 + 4^*x) - 0.2^*\sin(-0.3 + 0.5^*x)$ $H(x) = 1.0/7.0 ^* (x - 0.7) + 0.1, x < 0.7$ $H(x) = -1.0/3.0 ^* (x - 0.7) + 0.2, x >= 0.7$ The corresponding model curve is shown in FIG. 3b.

The error of the approximation of the object line by the model found turns out to be 0.005. Respectively, on the step 2, $\epsilon$ is chosen to be 0.03. k is chosen to be 2 on each segment.

M, equal to the maximum absolute value of the third derivative of the smooth component in the above mode, as computed by the standard subroutine, is 8. The maximal possible pitch h of the grid to be constructed, is defined by $(1/6) M (h/2)^3 = \epsilon$, or $h \simeq 0.24$. In order to provide a uniform grid, a smaller value $h = 0.2$ is chosen on each segment. The corresponding grid points are the following: 0.1, 0.3, 0.5 on [0.0, 0.6], the only grid point 0.7 on [0.6, 0.8] and the only grid point 0.9 on [0.8, 1.0]. Taylor polynomials at these points, as computed by the standard "MATHEMATICA" subroutine, are given in the following array 3.

| $Z_i$ | a0 | a1 | a2 |
|---|---|---|---|
| 0.1 | 0.121582031250 | 0.105957031250 | 0.993652343750 |
| 0.3 | 0.180175781250 | 0.454345703125 | 0.632080078125 |
| 0.5 | 0.285644531250 | 0.542724609375 | −0.236083984375 |
| 0.9 | 0.381103515625 | −0.727050781250 | −1.394042968750 |
| 0.7 | 0.272460937500 | 0.125244140625 | −1.083496093750 |

| | |
|---|---|
| a = 0.142822265625 | b = 0.099853515625 |
| c = −0.333251953125 | d = 0.199951171875 |

Now the coefficients of order 0 are rounded off up to 3 digits, the coefficients of order 1 are rounded off up to 2 digits and the coefficients of order 2 up to 1 digit. The parameters of the normal form H are rounded off up to three digits. These data, listed in the following array 4 represent the intermediate compressed image.

| $Z_i$ | a0 | a1 | a2 |
|---|---|---|---|
| 0.1 | 0.121 | 0.10 | 0.9 |
| 0.3 | 0.180 | 0.45 | 0.6 |
| 0.5 | 0.285 | 0.54 | −0.2 |
| 0.9 | 0.381 | −0.72 | −1.3 |
| 0.7 | 0.272 | 0.12 | −1.0 |

| | |
|---|---|
| a = 0.142 | b = 0.100 |
| c = −0.333 | d = 0.200 |

The compression ratio is 4*100 digits/37 digits≃10.8.

The final image is obtained by computing the values of the Taylor polynomials (and the normal form H on [0.6, 0.8]) at the initial points x, i=0, ..., 100. Each polynomial is used for x, belonging to the corresponding cell of the grid $z_i$. The result is shown in the following array 5.

| | | | | | | | | |
|---|---|---|---|---|---|---|---|---|
| 0.1196 | 0.1190 | 0.1185 | 0.1183 | 0.1182 | 0.1183 | 0.1186 | 0.1190 | 0.1197 |
| 0.1205 | 0.1215 | 0.1227 | 0.1240 | 0.1256 | 0.1273 | 0.1292 | 0.1313 | 0.1335 |
| 0.1360 | 0.1386 | 0.1426 | 0.1460 | 0.1496 | 0.1532 | 0.1570 | 0.1609 | 0.1649 |
| 0.1691 | 0.1733 | 0.1777 | 0.1822 | 0.1868 | 0.1916 | 0.1964 | 0.2014 | 0.2065 |
| 0.2117 | 0.2171 | 0.2225 | 0.2281 | 0.2318 | 0.2376 | 0.2433 | 0.2490 | 0.2546 |
| 0.2602 | 0.2658 | 0.2713 | 0.2768 | 0.2822 | 0.2876 | 0.2930 | 0.2983 | 0.3036 |
| 0.3088 | 0.3140 | 0.3192 | 0.3243 | 0.3294 | 0.3344 | 0.3380 | 0.3424 | 0.3466 |
| 0.3506 | 0.3545 | 0.3581 | 0.3615 | 0.3648 | 0.3678 | 0.3706 | 0.4709 | 0.4685 |
| 0.4660 | 0.4633 | 0.4603 | 0.4572 | 0.4539 | 0.4503 | 0.4466 | 0.4427 | 0.4376 |
| 0.4328 | 0.4276 | 0.4223 | 0.4166 | 0.4107 | 0.4046 | 0.3981 | 0.3915 | 0.3845 |
| 0.3773 | 0.3699 | 0.3621 | 0.3542 | 0.3459 | 0.3374 | 0.3287 | 0.3196 | 0.3104 |
| 0.3008 | | | | | | | | |

Figure 3C:
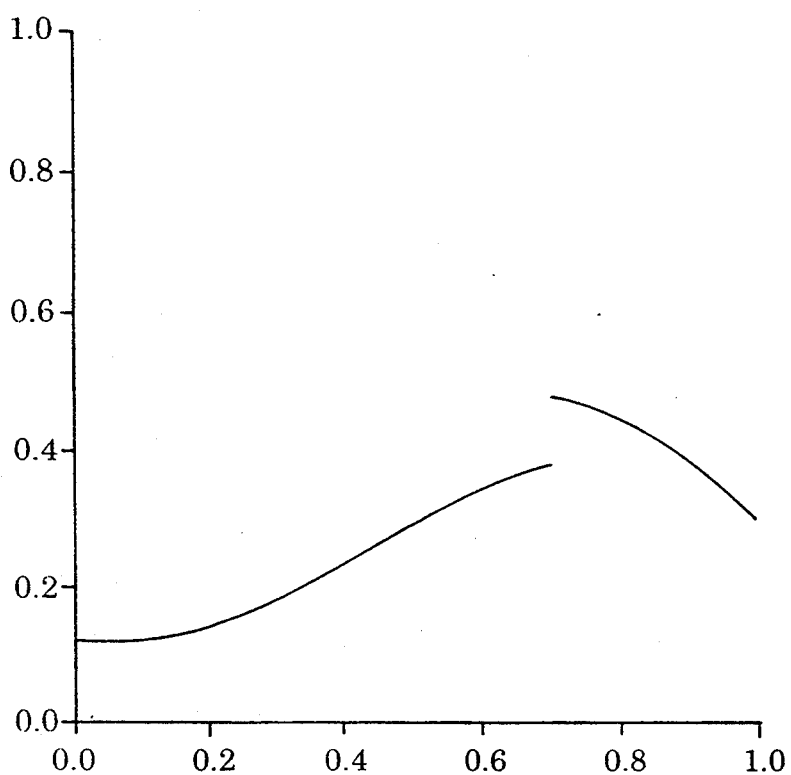
Figure 3D:
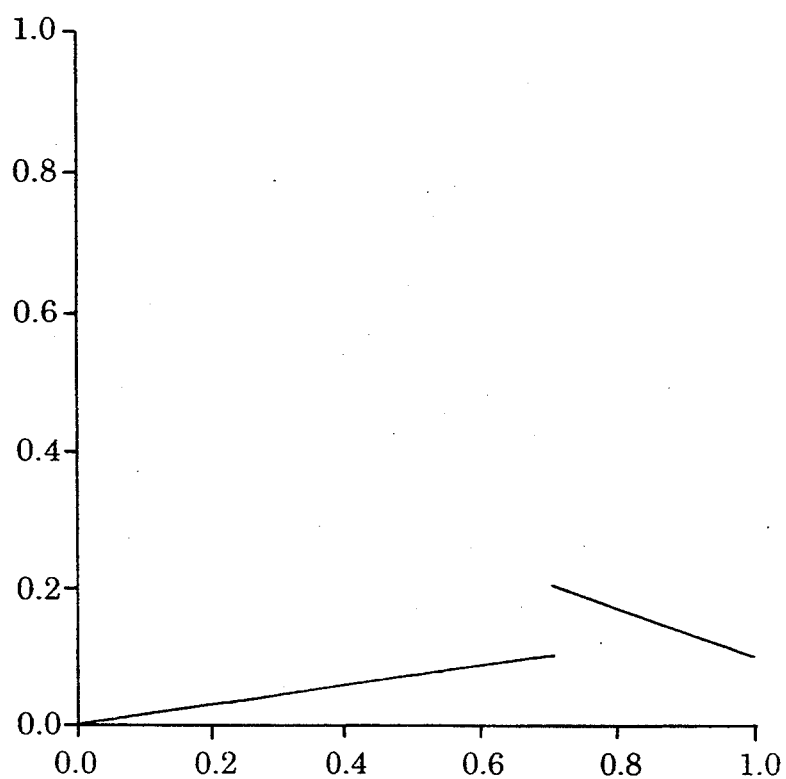

The corresponding final curve is shown in FIG. 3c. The maximal error in representing the object curve by the final one is 0.033.

EXAMPLE 2

Figure 4A:
FIGS. 4a and 4b represent a picture and its image, respectively, with reference to Example 2.

The object (black and white, continuous tone) picture is the standard test picture, called "Lena" (see FIG. 4a). It is represented by a 512×512 array, each pixel containing 8 bits, representing one of the gray levels between 0 to 255. The file representing this picture is available in test collections in the field of imaging. A part of this array, representing the piece S, marked on FIG. 4a, is the following.

| | | | | | | | | | | | | | | | | |
|---|---|---|---|---|---|---|---|---|---|---|---|---|---|---|---|---|
| 97 | 97 | 97 | 97 | 97 | 97 | 100 | 98 | 96 | 94 | 92 | 90 | 89 | 86 | 84 | 84 | 86 |
| 89 | 93 | 96 | 101 | 109 | 120 | 133 | 152 | 171 | 188 | 202 | 213 | 222 | 214 | 200 | 185 | 167 |
| 148 | 127 | 138 | 136 | 133 | 130 | 128 | 125 | 115 | 114 | 113 | 111 | 110 | 109 | | | |
| 97 | 97 | 97 | 97 | 97 | 97 | 99 | 97 | 95 | 93 | 91 | 89 | 89 | 85 | 83 | 83 | 85 |
| 89 | 92 | 95 | 100 | 108 | 119 | 132 | 150 | 169 | 186 | 200 | 211 | 220 | 217 | 203 | 187 | 169 |
| 149 | 127 | 138 | 135 | 132 | 130 | 127 | 124 | 115 | 114 | 113 | 111 | 110 | 109 | | | |
| 97 | 97 | 97 | 97 | 97 | 97 | 98 | 96 | 94 | 92 | 90 | 88 | 88 | 84 | 83 | 83 | 84 |
| 88 | 92 | 94 | 100 | 108 | 118 | 132 | 148 | 167 | 184 | 198 | 209 | 218 | 221 | 206 | 189 | 171 |
| 150 | 128 | 137 | 134 | 132 | 129 | 126 | 124 | 115 | 114 | 113 | 111 | 110 | 109 | | | |
| 97 | 97 | 97 | 97 | 97 | 97 | 98 | 96 | 94 | 92 | 90 | 88 | 87 | 84 | 82 | 82 | 84 |
| 88 | 92 | 94 | 99 | 107 | 118 | 131 | 146 | 165 | 182 | 196 | 207 | 216 | 224 | 208 | 191 | 172 |
| 152 | 129 | 136 | 134 | 131 | 128 | 126 | 123 | 115 | 114 | 123 | 111 | 110 | 109 | | | |
| 97 | 97 | 97 | 97 | 97 | 97 | 97 | 95 | 93 | 91 | 89 | 87 | 87 | 83 | 81 | 81 | 83 |
| 87 | 90 | 93 | 98 | 106 | 117 | 130 | 144 | 163 | 180 | 194 | 205 | 214 | 227 | 211 | 193 | 174 |
| 153 | 130 | 136 | 133 | 130 | 128 | 125 | 122 | 115 | 114 | 113 | 111 | 110 | 109 | | | |
| 97 | 97 | 97 | 97 | 97 | 97 | 96 | 94 | 92 | 90 | 88 | 86 | 86 | 82 | 81 | 81 | 82 |
| 86 | 90 | 92 | 98 | 106 | 116 | 130 | 142 | 161 | 178 | 192 | 203 | 212 | 230 | 214 | 196 | 176 |
| 154 | 131 | 135 | 132 | 130 | 127 | 124 | 122 | 115 | 114 | 113 | 111 | 110 | 109 | | | |
| 99 | 96 | 95 | 93 | 93 | 94 | 94 | 93 | 92 | 90 | 87 | 85 | 85 | 85 | 85 | 85 | 85 |
| 85 | 86 | 90 | 96 | 104 | 114 | 125 | 136 | 145 | 158 | 175 | 195 | 219 | 220 | 222 | 213 | 193 |
| 161 | 117 | 134 | 132 | 129 | 127 | 125 | 122 | 121 | 118 | 115 | 111 | 108 | 105 | | | |
| 95 | 93 | 91 | 91 | 91 | 92 | 95 | 95 | 95 | 93 | 91 | 88 | 84 | 84 | 84 | 84 | 84 |
| 84 | 87 | 91 | 97 | 104 | 113 | 124 | 134 | 144 | 157 | 174 | 194 | 218 | 220 | 223 | 215 | 195 |
| 163 | 120 | 133 | 131 | 129 | 127 | 125 | 123 | 121 | 118 | 115 | 111 | 108 | 105 | | | |
| 92 | 90 | 89 | 88 | 89 | 91 | 96 | 96 | 96 | 95 | 92 | 89 | 84 | 84 | 84 | 84 | 84 |
| 84 | 88 | 92 | 97 | 104 | 112 | 123 | 133 | 143 | 156 | 172 | 193 | 216 | 220 | 224 | 216 | 196 |
| 165 | 122 | 131 | 129 | 128 | 126 | 125 | 123 | 121 | 118 | 118 | 111 | 108 | 105 | | | |
| 88 | 86 | 86 | 86 | 87 | 89 | 97 | 98 | 97 | 96 | 94 | 91 | 84 | 84 | 84 | 84 | 84 |
| 84 | 89 | 92 | 97 | 103 | 112 | 122 | 132 | 141 | 154 | 171 | 191 | 215 | 220 | 224 | 217 | 198 |
| 167 | 125 | 128 | 127 | 125 | 124 | 123 | 122 | 121 | 118 | 115 | 111 | 108 | 105 | | | |
| 84 | 83 | 83 | 83 | 85 | 87 | 99 | 99 | 99 | 97 | 95 | 92 | 86 | 86 | 86 | 86 | 86 |
| 86 | 91 | 93 | 97 | 103 | 111 | 121 | 130 | 140 | 153 | 110 | 190 | 214 | 221 | 225 | 218 | 199 |
| 169 | 127 | 124 | 123 | 122 | 122 | 121 | 120 | 121 | 118 | 115 | 111 | 108 | 105 | | | |
| 80 | 80 | 80 | 81 | 83 | 86 | 100 | 100 | 100 | 99 | 96 | 93 | 88 | 88 | 88 | 88 | 88 |
| 88 | 92 | 94 | 97 | 103 | 110 | 119 | 129 | 139 | 152 | 168 | 189 | 212 | 221 | 226 | 219 | 201 |

-continued

| | | | | | | | | | | | | | | | | |
|---|---|---|---|---|---|---|---|---|---|---|---|---|---|---|---|---|
| 171 | 130 | 119 | 119 | 118 | 118 | 118 | 118 | 121 | 118 | 115 | 111 | 108 | 105 | | | |
| 65 | 71 | 78 | 85 | 91 | 98 | 100 | 100 | 100 | 101 | 101 | 102 | 102 | 100 | 97 | 94 | 88 |
| 83 | 91 | 91 | 93 | 97 | 105 | 115 | 128 | 143 | 157 | 172 | 187 | 201 | 223 | 229 | 223 | 205 |
| 174 | 130 | 118 | 118 | 118 | 118 | 118 | 118 | 118 | 114 | 111 | 107 | 103 | 99 | | | |
| 65 | 72 | 79 | 85 | 92 | 99 | 104 | 104 | 104 | 104 | 104 | 104 | 107 | 105 | 103 | 99 | 95 |
| 90 | 89 | 88 | 90 | 95 | 102 | 112 | 128 | 143 | 158 | 172 | 187 | 202 | 219 | 226 | 220 | 202 |
| 172 | 129 | 118 | 118 | 118 | 118 | 118 | 118 | 115 | 112 | 109 | 105 | 102 | 99 | | | |
| 66 | 73 | 79 | 86 | 93 | 99 | 106 | 105 | 105 | 104 | 104 | 104 | 108 | 107 | 105 | 102 | 98 |
| 94 | 86 | 85 | 87 | 92 | 99 | 109 | 127 | 141 | 156 | 171 | 185 | 200 | 214 | 221 | 216 | 198 |
| 168 | 126 | 118 | 118 | 118 | 118 | 118 | 118 | 113 | 110 | 108 | 105 | 102 | 99 | | | |
| 67 | 73 | 80 | 87 | 93 | 100 | 105 | 104 | 103 | 102 | 101 | 100 | 107 | 106 | 105 | 102 | 99 |
| 95 | 83 | 83 | 85 | 89 | 97 | 107 | 123 | 138 | 153 | 167 | 182 | 197 | 207 | 214 | 210 | 193 |
| 163 | 121 | 118 | 118 | 118 | 118 | 118 | 118 | 112 | 110 | 107 | 105 | 102 | 100 | | | |
| 67 | 74 | 81 | 87 | 94 | 101 | 101 | 100 | 99 | 97 | 96 | 95 | 103 | 103 | 102 | 100 | 97 |
| 93 | 81 | 80 | 82 | 87 | 94 | 104 | 118 | 133 | 148 | 162 | 177 | 192 | 198 | 206 | 202 | 185 |
| 156 | 114 | 118 | 118 | 118 | 118 | 118 | 118 | 112 | 110 | 108 | 106 | 104 | 102 | | | |
| 68 | 75 | 81 | 88 | 95 | 101 | 95 | 93 | 92 | 90 | 88 | 86 | 97 | 97 | 96 | 95 | 92 |
| 89 | 78 | 77 | 79 | 84 | 91 | 101 | 111 | 126 | 141 | 155 | 170 | 185 | 187 | 196 | 192 | 176 |
| 147 | 106 | 118 | 118 | 118 | 118 | 118 | 118 | 113 | 111 | 110 | 108 | 106 | 105 | | | |
| 79 | 83 | 88 | 93 | 97 | 102 | 94 | 69 | 48 | 30 | 15 | 4 | 40 | 51 | 59 | 65 | 68 |
| 68 | 80 | 80 | 82 | 85 | 88 | 93 | 94 | 110 | 128 | 146 | 164 | 184 | 192 | 176 | 160 | 146 |
| 132 | 120 | 116 | 115 | 115 | 115 | 115 | 114 | 103 | 106 | 104 | 102 | 98 | 94 | | | |
| 80 | 83 | 86 | 90 | 93 | 96 | 89 | 68 | 50 | 36 | 26 | 19 | 44 | 53 | 59 | 62 | 63 |
| 61 | 71 | 72 | 14 | 76 | 80 | 84 | 86 | 102 | 119 | 137 | 156 | 176 | 185 | 171 | 157 | 145 |
| 133 | 122 | 117 | 116 | 115 | 115 | 114 | 113 | 109 | 108 | 106 | 104 | 100 | 96 | | | |
| 81 | 83 | 85 | 87 | 89 | 91 | 86 | 69 | 56 | 46 | 39 | 36 | 53 | 59 | 63 | 64 | 63 |
| 58 | 66 | 67 | 69 | 72 | 75 | 80 | 81 | 97 | 114 | 132 | 151 | 171 | 179 | 166 | 155 | 144 |
| 134 | 125 | 118 | 117 | 116 | 114 | 113 | 112 | 110 | 109 | 107 | 104 | 101 | 96 | | | |
| 84 | 85 | 85 | 86 | 87 | 87 | 86 | 73 | 64 | 58 | 55 | 56 | 66 | 70 | 71 | 70 | 67 |
| 60 | 65 | 66 | 68 | 70 | 74 | 78 | 80 | 96 | 113 | 131 | 150 | 170 | 173 | 162 | 152 | 143 |
| 134 | 127 | 119 | 117 | 116 | 114 | 113 | 111 | 110 | 109 | 107 | 104 | 101 | 96 | | | |
| 88 | 87 | 86 | 86 | 85 | 84 | 89 | 80 | 74 | 72 | 74 | 79 | 83 | 85 | 84 | 81 | 75 |
| 66 | 67 | 68 | 70 | 72 | 76 | 80 | 82 | 98 | 115 | 133 | 152 | 172 | 166 | 157 | 149 | 141 |
| 135 | 129 | 120 | 118 | 116 | 114 | 112 | 110 | 109 | 108 | 106 | 104 | 100 | 96 | | | |
| 92 | 90 | 88 | 86 | 84 | 82 | 94 | 89 | 88 | 90 | 95 | 104 | 105 | 105 | 102 | 96 | 88 |
| 77 | 72 | 73 | 74 | 76 | 78 | 82 | 86 | 88 | 104 | 121 | 139 | 158 | 178 | 160 | 152 | 146 | 140 |
| 136 | 132 | 121 | 119 | 116 | 114 | 111 | 109 | 107 | 106 | 104 | 102 | 98 | 94 | | | |
| 107 | 104 | 101 | 98 | 94 | 91 | 86 | 84 | 83 | 83 | 84 | 86 | 91 | 97 | 98 | 93 | 83 |
| 68 | 62 | 71 | 82 | 96 | 113 | 132 | 158 | 162 | 166 | 168 | 170 | 171 | 154 | 148 | 141 | 134 |
| 128 | 121 | 124 | 192 | 119 | 116 | 114 | 111 | 105 | 104 | 102 | 101 | 100 | 98 | | | |
| 113 | 110 | 107 | 105 | 102 | 99 | 91 | 89 | 88 | 88 | 89 | 91 | 94 | 103 | 106 | 104 | 97 |
| 84 | 87 | 96 | 107 | 121 | 138 | 157 | 169 | 172 | 174 | 176 | 176 | 176 | 154 | 147 | 140 | 134 |
| 127 | 120 | 124 | 121 | 118 | 116 | 113 | 110 | 104 | 103 | 102 | 100 | 99 | 98 | | | |
| 117 | 114 | 112 | 110 | 108 | 106 | 95 | 94 | 93 | 93 | 94 | 95 | 99 | 111 | 117 | 117 | 113 |
| 103 | 105 | 114 | 125 | 139 | 156 | 175 | 178 | 179 | 180 | 180 | 179 | 178 | 153 | 146 | 140 | 133 |
| 126 | 120 | 123 | 120 | 118 | 115 | 112 | 110 | 104 | 102 | 101 | 100 | 98 | 97 | | | |
| 119 | 117 | 115 | 114 | 112 | 110 | 100 | 98 | 97 | 97 | 98 | 100 | 106 | 120 | 129 | 132 | 130 |
| 123 | 116 | 124 | 136 | 150 | 166 | 186 | 184 | 184 | 184 | 182 | 180 | 177 | 152 | 146 | 139 | 132 |
| 126 | 119 | 122 | 120 | 117 | 114 | 112 | 109 | 103 | 102 | 100 | 99 | 98 | 96 | | | |
| 119 | 118 | 117 | 115 | 114 | 113 | 105 | 103 | 102 | 102 | 103 | 105 | 114 | 131 | 142 | 148 | 149 |
| 144 | 119 | 128 | 139 | 153 | 170 | 189 | 187 | 186 | 184 | 182 | 178 | 174 | 152 | 145 | 138 | 132 |
| 125 | 118 | 122 | 119 | 116 | 114 | 111 | 108 | 102 | 101 | 100 | 98 | 97 | 96 | | | |
| 118 | 117 | 116 | 115 | 114 | 114 | 109 | 108 | 107 | 107 | 108 | 109 | 125 | 144 | 158 | 167 | 170 |
| 168 | 116 | 124 | 136 | 150 | 166 | 186 | 188 | 185 | 182 | 178 | 173 | 168 | 151 | 144 | 138 | 131 |
| 124 | 118 | 121 | 118 | 116 | 113 | 110 | 108 | 102 | 100 | 99 | 98 | 96 | 95 | | | |
| 118 | 118 | 118 | 118 | 118 | 118 | 111 | 110 | 111 | 114 | 118 | 125 | 131 | 156 | 133 | 183 | 184 |
| 177 | 152 | 145 | 145 | 153 | 169 | 194 | 185 | 184 | 182 | 180 | 179 | 177 | 154 | 145 | 136 | 129 |
| 123 | 117 | 112 | 114 | 114 | 112 | 108 | 102 | 96 | 108 | 111 | 107 | 95 | 75 | | | |
| 118 | 118 | 118 | 118 | 118 | 118 | 114 | 113 | 114 | 117 | 121 | 127 | 136 | 161 | 178 | 186 | 187 |
| 180 | 157 | 148 | 147 | 155 | 170 | 193 | 188 | 186 | 184 | 182 | 180 | 178 | 153 | 144 | 136 | 128 |
| 122 | 116 | 112 | 114 | 114 | 112 | 108 | 102 | 98 | 107 | 108 | 100 | 85 | 62 | | | |
| 118 | 118 | 118 | 118 | 118 | 118 | 117 | 116 | 117 | 119 | 124 | 130 | 141 | 166 | 182 | 190 | 190 |
| 183 | 161 | 151 | 150 | 156 | 171 | 193 | 190 | 188 | 185 | 183 | 180 | 178 | 152 | 143 | 135 | 128 |
| 121 | 116 | 112 | 114 | 114 | 112 | 108 | 102 | 101 | 106 | 104 | 93 | 75 | 49 | | | |
| 118 | 118 | 118 | 118 | 118 | 118 | 119 | 118 | 119 | 122 | 126 | 133 | 147 | 170 | 186 | 194 | 194 |
| 185 | 165 | 155 | 152 | 158 | 171 | 193 | 191 | 188 | 185 | 182 | 180 | 177 | 152 | 143 | 134 | 127 |
| 121 | 115 | 112 | 114 | 114 | 112 | 108 | 102 | 103 | 106 | 100 | 87 | 65 | 35 | | | |
| 118 | 118 | 118 | 118 | 118 | 118 | 122 | 121 | 122 | 125 | 129 | 135 | 152 | 175 | 190 | 198 | 197 |
| 188 | 169 | 158 | 155 | 159 | 172 | 193 | 191 | 188 | 185 | 181 | 178 | 775 | 151 | 142 | 134 | 126 |
| 120 | 114 | 112 | 114 | 114 | 112 | 108 | 102 | 106 | 105 | 96 | 80 | 55 | 22 | | | |
| 118 | 118 | 118 | 118 | 118 | 118 | 125 | 124 | 125 | 127 | 132 | 138 | 157 | 180 | 195 | 201 | 200 |
| 191 | 174 | 161 | 157 | 161 | 173 | 192 | 191 | 187 | 183 | 179 | 176 | 172 | 150 | 141 | 133 | 126 |
| 119 | 114 | 112 | 114 | 114 | 112 | 108 | 102 | 108 | 104 | 93 | 73 | 45 | 9 | | | |
| 114 | 117 | 119 | 122 | 125 | 127 | 120 | 123 | 126 | 130 | 136 | 142 | 160 | 176 | 188 | 196 | 198 |
| 196 | 158 | 152 | 151 | 154 | 162 | 174 | 198 | 191 | 184 | 178 | 173 | 169 | 160 | 140 | 125 | 116 |
| 112 | 113 | 112 | 111 | 110 | 109 | 108 | 107 | 121 | 90 | 64 | 44 | 29 | 19 | | | |
| 112 | 115 | 118 | 120 | 123 | 126 | 124 | 126 | 128 | 132 | 136 | 141 | 168 | 184 | 195 | 202 | 204 |
| 202 | 175 | 168 | 166 | 168 | 174 | 185 | 200 | 194 | 189 | 185 | 182 | 180 | 161 | 140 | 125 | 115 |
| 110 | 111 | 111 | 110 | 109 | 109 | 108 | 107 | 111 | 82 | 58 | 39 | 26 | 18 | | | |
| 111 | 114 | 113 | 119 | 122 | 125 | 128 | 128 | 130 | 132 | 136 | 140 | 168 | 183 | 194 | 200 | 202 |
| 199 | 186 | 178 | 174 | 174 | 180 | 189 | 193 | 189 | 186 | 184 | 183 | 182 | 160 | 139 | 123 | 113 |
| 108 | 108 | 109 | 109 | 108 | 108 | 108 | 108 | 102 | 74 | 52 | 35 | 23 | 17 | | | |

-continued

| | | | | | | | | | | | | | | | | |
|---|---|---|---|---|---|---|---|---|---|---|---|---|---|---|---|---|
| 111 | 114 | 117 | 119 | 122 | 125 | 130 | 130 | 130 | 132 | 134 | 138 | 158 | 193 | 183 | 189 | 190 |
| 187 | 190 | 181 | 176 | 175 | 179 | 187 | 179 | 177 | 175 | 175 | 175 | 177 | 158 | 137 | 121 | 110 |
| 104 | 104 | 107 | 107 | 108 | 108 | 108 | 108 | 92 | 66 | 46 | 30 | 21 | 16 | | | |
| 112 | 115 | 118 | 120 | 123 | 126 | 131 | 130 | 130 | 130 | 132 | 134 | 140 | 154 | 164 | 169 | 170 |
| 166 | 189 | 178 | 172 | 170 | 172 | 179 | 156 | 156 | 156 | 158 | 160 | 163 | 156 | 134 | 117 | 106 |
| 100 | 99 | 105 | 106 | 107 | 107 | 108 | 109 | 82 | 58 | 39 | 26 | 18 | 15 | | | |
| 114 | 117 | 119 | 122 | 125 | 127 | 132 | 130 | 128 | 128 | 129 | 130 | 112 | 126 | 136 | 140 | 141 |
| 137 | 181 | 169 | 161 | 158 | 159 | 164 | 126 | 127 | 130 | 133 | 137 | 142 | 153 | 130 | 113 | 101 |
| 95 | 94 | 104 | 105 | 106 | 107 | 108 | 109 | 72 | 50 | 33 | 22 | 15 | 14 | | | |
| 117 | 115 | 113 | 112 | 113 | 114 | 109 | 105 | 102 | 101 | 100 | 100 | 97 | 102 | 105 | 108 | 110 |
| 111 | 134 | 134 | 131 | 127 | 121 | 113 | 110 | 113 | 116 | 119 | 122 | 125 | 111 | 100 | 93 | 91 |
| 93 | 100 | 91 | 110 | 120 | 121 | 114 | 97 | 29 | 27 | 25 | 24 | 22 | 20 | | | |
| 100 | 98 | 96 | 96 | 96 | 97 | 95 | 92 | 90 | 88 | 88 | 88 | 87 | 91 | 95 | 97 | 99 |
| 100 | 117 | 116 | 113 | 108 | 102 | 94 | 81 | 85 | 89 | 93 | 97 | 101 | 91 | 82 | 78 | 78 |
| 82 | 91 | 100 | 114 | 120 | 116 | 104 | 83 | 25 | 24 | 23 | 21 | 20 | 19 | | | |
| 86 | 84 | 82 | 82 | 82 | 83 | 82 | 80 | 78 | 77 | 77 | 78 | 77 | 82 | 85 | 88 | 90 |
| 91 | 103 | 102 | 98 | 93 | 86 | 78 | 61 | 66 | 71 | 76 | 81 | 86 | 78 | 72 | 69 | 72 |
| 78 | 89 | 107 | 117 | 118 | 110 | 94 | 68 | 23 | 22 | 21 | 20 | 19 | 18 | | | |
| 75 | 73 | 71 | 70 | 71 | 72 | 71 | 68 | 67 | 67 | 67 | 68 | 70 | 75 | 78 | 81 | 83 |
| 83 | 93 | 91 | 87 | 82 | 74 | 65 | 50 | 56 | 62 | 68 | 73 | 79 | 73 | 68 | 68 | 73 |
| 82 | 95 | 113 | 119 | 116 | 103 | 82 | 52 | 21 | 20 | 20 | 20 | 19 | 19 | | | |
| 66 | 64 | 62 | 62 | 62 | 63 | 60 | 58 | 57 | 57 | 58 | 60 | 65 | 69 | 73 | 75 | 77 |
| 78 | 86 | 84 | 80 | 74 | 66 | 56 | 48 | 55 | 62 | 68 | 75 | 82 | 74 | 72 | 74 | 81 |
| 92 | 108 | 119 | 120 | 112 | 96 | 70 | 36 | 20 | 20 | 20 | 20 | 20 | 20 | | | |
| 60 | 58 | 56 | 56 | 56 | 57 | 50 | 48 | 48 | 48 | 50 | 52 | 61 | 65 | 69 | 71 | 73 |
| 74 | 83 | 80 | 76 | 69 | 61 | 51 | 55 | 63 | 70 | 78 | 85 | 93 | 83 | 83 | 87 | 96 |
| 110 | 127 | 124 | 120 | 108 | 67 | 57 | 18 | 20 | 20 | 21 | 21 | 22 | 22 | | | |

The compressed image is produced as follows: first, the picture is subdivided into square segments, containing $6 \times 6 = 36$ pixels each one. See FIG. 4a and the array S above, where one of such segments is marked. The step 1 consists in approximating the picture on each segment by the model, which is chosen to be the quadratic polynomial $$z = a_0 + a_1 x + a_2 y + a_{11} x^2 + 2 a_{12} xy + a_{22} y^2$$

where z represents the gray level, and x and y are the coordinates on the picture plane centered at the center of the corresponding segment. The values of the coefficient "a" are found by the standard subroutine, minimizing the quadratic error of the approximation of the gray level on each segment by the model chosen.

The array of $8 \times 8 = 64$ polynomials, obtained on the segments, covering the piece S of the picture, is given in the following array 7.

| | | | | | |
|---|---|---|---|---|---|
| 0.37500000 | −0.0058594 | −0.0055246 | 0.001883 | −0.007146 | 0.010986 |
| 0.35937500 | −0.0104353 | −0.0276228 | 0.007010 | 0.013632 | 0.009208 |
| 0.31640625 | −0.0081473 | 0.0078125 | 0.010149 | −0.001263 | 0.033064 |
| 0.39843750 | −0.0127790 | 0.0998326 | 0.003348 | 0.014263 | 0.062360 |
| 0.74218750 | −0.0247767 | 0.1643973 | −0.015172 | 0.000459 | −0.049700 |
| 0.70703125 | 0.0304130 | −0.2262835 | −0.009312 | −0.027809 | −0.038191 |
| 0.50781250 | −0.0092076 | −0.0348772 | −0.015067 | −0.003071 | 0.007847 |
| 0.43359375 | 0.0021763 | −0.0233817 | 0.007010 | 0.004908 | −0.004918 |
| 0.33993750 | −0.0344308 | −0.0031808 | 0.003348 | 0.027637 | 0.026263 |
| 0.37109375 | 0.0164063 | −0.0194196 | −0.005022 | 0.008954 | −0.022600 |
| 0.32421875 | 0.0092634 | −0.0077009 | 0.016532 | −0.015383 | −0.003871 |
| 0.38671875 | −0.0045201 | 0.0907478 | 0.006069 | −0.026834 | 0.035575 |
| 0.63671875 | −0.0199777 | 0.1973214 | 0.009626 | −0.011422 | 0.066127 |
| 0.81250000 | 0.0224331 | −0.2329241 | 0.003558 | 0.016875 | −0.205811 |
| 0.48828125 | −0.0261161 | −0.0174107 | −0.025321 | 0.024337 | 0.006069 |
| 0.43750000 | 0.0035156 | −0.0440290 | −0.002511 | −0.010188 | −0.007533 |
| 0.32031250 | 0.0101563 | 0.0811384 | 0.006278 | 0.006256 | 0.002511 |
| 0.40234375 | −0.0292969 | −0.0090960 | −0.058594 | −0.026260 | 0.015172 |
| 0.40234375 | −0.0013951 | −0.0376674 | −0.050642 | 0.022643 | −0.022391 |
| 0.33984375 | −0.0376116 | 0.0617188 | 0.004290 | −0.008265 | 0.046980 |
| 0.63281250 | −0.0425223 | 0.1786830 | −0.036516 | 0.004305 | 0.006173 |
| 0.80468750 | −0.0712053 | −0.2079241 | −0.040388 | 0.029043 | −0.234375 |
| 0.45703125 | −0.0006696 | 0.0003348 | −0.000314 | −0.009184 | −0.011300 |
| 0.41075625 | 0.0016741 | −0.0319196 | 0.020299 | 0.019056 | −0.000732 |
| 0.33203125 | −0.0089286 | 0.0193080 | 0.020194 | −0.052519 | 0.014544 |
| 0.21093750 | 0.1237165 | −0.0967076 | 0.060059 | 0.156036 | 0.077009 |
| 0.25781250 | 0.0914063 | 0.0062500 | 0.087995 | −0.093673 | −0.055455 |
| 0.26562500 | −0.0221540 | 0.0343192 | 0.074916 | −0.002899 | 0.018101 |
| 0.47265625 | −0.0229911 | 0.2156250 | 0.078055 | 0.008839 | 0.015904 |
| 0.57812500 | −0.0305245 | −0.1201451 | −0.003557 | 0.072006 | 0.021240 |
| 0.44531950 | 0.0000558 | −0.0220424 | 0.014230 | −0.028096 | 0.001674 |
| 0.41015625 | −0.0073103 | −0.0318638 | −0.019148 | 0.008409 | −0.016950 |
| 0.43750000 | 0.0410714 | −0.0239955 | −0.033378 | 0.020663 | −0.000732 |
| 0.36718750 | 0.0566406 | 0.0056362 | 0.014962 | −0.005309 | 0.016218 |
| 0.48046875 | 0.1614397 | 0.0278460 | 0.038295 | 0.096687 | −0.109236 |
| 0.53906250 | 0.1313058 | 0.1659040 | −0.128697 | 0.012.025 | 0.054618 |
| 0.71093750 | 0.0371094 | −0.0090960 | −0.059329 | −0.061617 | −0.031076 |
| 0.53125000 | −0.0079799 | −0.0807478 | 0.012347 | −0.010418 | 0.015486 |
| 0.44921875 | −0.0116630 | −0.0317522 | −0.008789 | 0.007950 | 0.000000 |

-continued

| | | | | | |
|---|---|---|---|---|---|
| 0.38671875 | −0.0111607 | −0.0160714 | −0.011300 | 0.000402 | 0.000000 |
| 0.45703125 | 0.0071429 | −0.0061384 | 0.010568 | 0.007691 | −0.002302 |
| 0.46093750 | 0.0342634 | 0.0351562 | 0.001988 | 0.005568 | 0.035261 |
| 0.73828125 | 0.0527344 | 0.0965960 | −0.012660 | −0.02.8109 | −0.150774 |
| 0.59765625 | 0.0304687 | 0.0774553 | −0.012556 | −0.041212 | 0.146589 |
| 0.71875000 | 0.0060268 | −0.0338170 | −0.019880 | −0.024452 | −0.011405 |
| 0.51171875 | −0.0079799 | −0.0932478 | −0.001569 | −0.002612 | 0.015695 |
| 0.43750000 | −0.0044085 | −0.0244978 | 0.009312 | −0.004334 | −0.033064 |
| 0.37500000 | −0.0677456 | −0.1410714 | 0.003557 | −0.121397 | −0.143032 |
| 0.45703125 | −0.0024554 | 0.0328125 | 0.024484 | 0.014522 | −0.005650 |
| 0.51171875 | −0.0028460 | 0.0307478 | −0.024170 | −0.036993 | 0.026681 |
| 0.75390625 | −0.1251674 | 0.0778460 | −0.168248 | −0.019142 | −0.088518 |
| 0.68359375 | 0.0162947 | 0.0053571 | −0.122001 | −0.059694 | 0.078265 |
| 0.70703125 | −0.1199218 | −0.0175781 | −0.155797 | 0.070226 | 0.024379 |
| 0.44921875 | −0.0365513 | −0.1284040 | −0.030866 | −0.027522 | 0.101597 |
| 0.41796875 | −0.0125000 | 0.0001116 | 0.000628 | 0.019687 | −0.008161 |
| 0.15234375 | −0.0695313 | −0.1944197 | 0.006906 | 0.062679 | 0.108608 |
| 0.29296875 | −0.1353237 | −0.0140067 | 0.060582 | 0.000373 | 0.015695 |
| 0.27734375 | −0.1326451 | −0.0152344 | 0.019357 | 0.018683 | 0.025635 |
| 0.32031250 | −0.0872768 | 0.0389509 | 0.044155 | −0.000804 | −0.024902 |
| 0.34765625 | −0.1336496 | −0.0653460 | 0.070103 | −0.026145 | −0.042585 |
| 0.26171875 | −0.1049665 | 0.0693639 | 0.164062 | 0.038772 | −0.000419 |
| 0.26562500 | 0.0065848 | 0.0437500 | 0.130371 | 0.086556 | 0.090193 |
| 0.43750000 | −0.0600446 | −0.1228795 | −0.031076 | −0.157902 | −0.156948 |
| 0.07421875 | −0.0148995 | −0.0127790 | 0.015904 | 0.030048 | 0.013079 |

(The coefficients are given after rescaling the x and y variables to the square [−1,1][−1,1], and the gray level z to [0,1]).

Step 2 The required accuracy $\epsilon$ is chosen to be 5 gray levels, k is fixed to be 2, and the grid on each segment is chosen to contain the only point—the center of this segment. Thus the Taylor polynomials computed on this step are identical to the approximating polynomials found on the step 1. The 6 digits accuracy with which the coefficients of these polynomials are given in the array P above is excessive, and the coefficients are rounded off up to 8 bits in degree 0, up to 7 bits in degree 1 and up to 6 bits in degree 2. The corresponding binary array is the intermediate compressed image. It is approximately represented by the following digital array P' (corresponding to the same piece S of the picture, as the above array P).

| | | | | | |
|---|---|---|---|---|---|
| 0.37500000 | 0.0000000 | 0.0000000 | 0.000000 | 0.000000 | 0.000000 |
| 0.35937500 | −0.0078125 | −0.0234375 | 0.000000 | 0.000000 | 0.000000 |
| 0.31640625 | −0.0078125 | 0.0000000 | 0.000000 | 0.000000 | 0.031250 |
| 0.39843750 | −0.0078125 | 0.0937500 | 0.000000 | 0.000000 | 0.046875 |
| 0.74218750 | −0.0234375 | 0.1640625 | 0.000000 | 0.000000 | −0.046875 |
| 0.70703125 | 0.0234375 | −0.2187500 | 0.000000 | −0.015625 | −0.031250 |
| 0.50781250 | −6.0078125 | −0.0312500 | 0.000000 | 0.000000 | 0.000000 |
| 0.43359375 | 0.0000000 | −0.0156250 | 0.000000 | 0.000000 | 0.000000 |
| 0.33593750 | −0.0312500 | 0.0000000 | 0.000000 | 0.015625 | 0.015625 |
| 0.37109375 | 0.0156250 | −0.0156250 | 0.000000 | 0.000000 | −0.025625 |
| 0.32421875 | 0.0078125 | 0.0000000 | 0.015625 | 0.000000 | 0.000000 |
| 0.38671875 | 0.0000000 | 0.0781250 | 0.000000 | −0.015625 | 0.031250 |
| 0.63671875 | −0.0156250 | 0.1953125 | 0.000000 | 0.000000 | 0.062500 |
| 0.81250000 | 0.0156250 | −0.2265625 | 0.000000 | 0.015625 | −0.203125 |
| 0.49218750 | −0.0234375 | −0.0156250 | −0.015625 | 0.015625 | 0.000000 |
| 0.43750000 | 0.0000000 | −0.0390625 | 0.000000 | 0.000000 | 0.000000 |
| 0.32031250 | 0.0078125 | 0.0781250 | 0.000000 | 0.000000 | 0.000000 |
| 0.40234375 | −0.0234375 | −0.0078125 | −0.046875 | −0.015625 | 0.000000 |
| 0.40234375 | 0.0000000 | −0.0312500 | −0.046875 | 0.015625 | −0.015525 |
| 0.33984375 | −0.0312500 | 0.0546875 | 0.000000 | 0.000000 | 0.046875 |
| 0.63281250 | −0.0390625 | 0.1718750 | −0.031250 | 0.000000 | 0.000000 |
| 0.80468750 | −0.0703125 | −0.2031250 | −0.031250 | 0.015625 | −0.218750 |
| 0.45703125 | 0.0000000 | 0.0000000 | 0.000000 | 0.000000 | 0.000000 |
| 0.41015625 | 0.0000000 | −0.0312500 | 0.015625 | 0.015625 | 0.000000 |
| 0.33203125 | −0.0078125 | 0.0156250 | 0.015625 | −0.046875 | 0.000000 |
| 0.21093750 | 0.1171875 | −0.0937500 | 0.046875 | 0.140625 | 0.062500 |
| 0.25781250 | 0.0859375 | 0.0000000 | 0.078125 | −0.078125 | −0.046875 |
| 0.26562500 | −0.0156250 | 0.0312500 | 0.062500 | 0.000000 | 0.015625 |
| 0.47656250 | −0.0156250 | 0.2109375 | 0.062500 | 0.000000 | 0.015625 |
| 0.57812500 | −0.0234375 | −0.1171875 | 0.000000 | 0.062500 | 0.015625 |
| 0.44531250 | 0.0000000 | −0.0156250 | 0.000000 | −0.015625 | 0.000000 |
| 0.41015625 | 0.0000000 | −0.0312500 | −0.015625 | 0.000000 | −0.015625 |
| 0.43750000 | 0.0390625 | −0.0234375 | −0.031250 | 0.015625 | 0.000000 |
| 0.36718750 | 0.0546875 | 0.0000000 | 0.000000 | 0.000000 | 0.015625 |
| 0.48437500 | 0.1562500 | 0.0234375 | 0.031250 | 0.093750 | −0.093750 |
| 0.53906250 | 0.1250000 | 0.1640625 | −0.125000 | 0.000000 | 0.046875 |
| 0.71093750 | 0.0312500 | −0.0078125 | −0.046875 | −0.046875 | −0.015625 |
| 0.53125000 | −0.0078125 | −0.0781250 | 0.000000 | 0.000000 | 0.000000 |
| 0.44921875 | −0.0078125 | −0.0312500 | 0.000000 | 0.000000 | 0.000000 |
| 0.38671875 | −0.0078125 | −0.0156250 | 0.000000 | 0.000000 | 0.000000 |
| 0.45703125 | 0.0000000 | 0.0000000 | 0.000000 | 0.000000 | 0.000000 |
| 0.46093750 | 0.0312500 | 0.0312500 | 0.000000 | 0.000000 | 0.031250 |
| 0.73828125 | 0.0468750 | 0.0937500 | 0.000000 | −0.015625 | −0.140625 |

-continued

| | | | | | |
|---|---|---|---|---|---|
| 0.59765625 | 0.0234375 | 0.0703125 | 0.000000 | −0.031250 | 0.140625 |
| 0.71875000 | 0.0000000 | −0.0312500 | −0.015625 | −0.015625 | 0.000000 |
| 0.51171875 | −0.0078125 | −0.0859375 | 0.000000 | 0.0000g0 | 0.015625 |
| 0.43750000 | 0.0000000 | −0.0234375 | 0.000000 | 0.000000 | −0.031250 |
| 0.37500000 | −0.0625000 | −0.1406250 | 0.000000 | −0.109375 | −0.140625 |
| 0.45703125 | 0.0000000 | 0.0312500 | 0.015625 | 0.000000 | 0.000000 |
| 0.51171875 | 0.0000000 | 0.0234375 | −0.015625 | −0.031250 | 0.015625 |
| 0.75390625 | −0.1250000 | 0.0703125 | −0.156250 | −0.015625 | −0.078125 |
| 0.68359375 | 0.0156250 | 0.0000000 | 0.109375 | −0.046875 | 0.078125 |
| 0.70703125 | −0.1171875 | −0.0156250 | −0.140625 | 0.062500 | 0.015625 |
| 0.44921875 | −0.0312500 | −0.1250000 | −0.015625 | −0.015625 | 0.093750 |
| 0.41796875 | −0.0078125 | 0.0000000 | 0.000000 | 0.015625 | 0.000000 |
| 0.15234375 | −0.0625000 | −0.1875000 | 0.000000 | 0.062500 | 0.093750 |
| 0.29296875 | −0.1328125 | −0.0078125 | 0.046875 | 0.000000 | 0.015625 |
| 0.27734375 | −0.1250000 | −0.0078125 | 0.015625 | 0.015625 | 0.015625 |
| 0.32031250 | −0.0859375 | 0.0312500 | 0.031250 | 0.000000 | −0.015625 |
| 0.34765625 | −0.1328125 | −0.0625000 | 0.062500 | −0.015625 | −0.031250 |
| 0.26171875 | −0.1015625 | 0.0625000 | 0.156250 | 0.031250 | 0.000000 |
| 0.26562500 | 0.0000000 | 0.0390625 | 0.125000 | 0.078125 | 0.078125 |
| 0.43750000 | −0.0546875 | −0.1171875 | −0.015625 | −0.156250 | −0.156250 |
| 0.07421875 | −0.0078125 | −0.0078125 | 0.015625 | 0.015625 | 0.000000 |

The compression ratio is 512*512*8 bits/86*86*(8+2*7÷3*6) bits≃6.7.

The final image is obtained by computing the values of the Taylor polynomials, representing the intermediate image, at each pixel of the corresponding segment. The part S' of the obtained array, representing the final image (and corresponding to the piece S of the initial picture), is the following array 9.

| | | | | | | | | | | | | | | | |
|---|---|---|---|---|---|---|---|---|---|---|---|---|---|---|---|
| 137 | 137 | 137 | 136 | 138 | 129 | 138 | 134 | 140 | 136 | 135 | 134 | 130 | 139 | 135 | 129 | 134 |
| 131 | 138 | 139 | 127 | 132 | 129 | 134 | 131 | 133 | 130 | 125 | 130 | 129 | 127 | 131 | 127 | 134 |
| 128 | 135 | 133 | 144 | 135 | 142 | 143 | 142 | 143 | 150 | 148 | 154 | 153 | 149 | | | |
| 149 | 149 | 143 | 154 | 145 | 142 | 135 | 133 | 118 | 120 | 127 | 110 | 98 | 82 | 86 | 74 | 63 |
| 65 | 63 | 61 | 55 | 67 | 72 | 66 | 73 | 69 | 73 | 74 | 73 | 73 | 70 | 78 | 80 | 76 |
| 75 | 73 | 72 | 80 | 80 | 78 | 77 | 75 | 75 | 76 | 78 | 78 | 75 | 78 | | | |
| 78 | 79 | 78 | 78 | 73 | 75 | 73 | 75 | 79 | 79 | 89 | 77 | 81 | 86 | 90 | 86 | 78 |
| 89 | 89 | 92 | 95 | 92 | 90 | 92 | 91 | 101 | 97 | 92 | 89 | 94 | 104 | 100 | 101 | 96 |
| 104 | 98 | 96 | 98 | 100 | 95 | 106 | 108 | 102 | 103 | 100 | 100 | 96 | 99 | | | |
| 104 | 91 | 98 | 95 | 105 | 101 | 98 | 101 | 97 | 102 | 97 | 97 | 105 | 104 | 105 | 103 | 95 |
| 102 | 97 | 105 | 102 | 102 | 102 | 103 | 103 | 99 | 103 | 96 | 106 | 102 | 99 | 102 | 101 | 106 | 100 |
| 104 | 103 | 101 | 102 | 100 | 100 | 100 | 104 | 108 | 103 | 104 | 99 | 104 | 99 | | | |
| 105 | 106 | 101 | 105 | 105 | 105 | 101 | 109 | 106 | 104 | 102 | 105 | 104 | 105 | 102 | 104 | 112 |
| 102 | 99 | 110 | 104 | 101 | 100 | 102 | 102 | 98 | 100 | 103 | 103 | 99 | 98 | 100 | 101 | 97 |
| 107 | 105 | 104 | 106 | 101 | 100 | 100 | 101 | 99 | 102 | 97 | 98 | 99 | 103 | | | |
| 105 | 103 | 101 | 103 | 101 | 105 | 104 | 109 | 102 | 99 | 102 | 103 | 96 | 96 | 103 | 108 | 109 |
| 114 | 104 | 102 | 102 | 97 | 99 | 97 | 100 | 102 | 98 | 101 | 102 | 102 | 99 | 98 | 99 | 97 |
| 100 | 102 | 93 | 100 | 105 | 105 | 99 | 97 | 96 | 102 | 96 | 101 | 104 | 94 | | | |
| 95 | 103 | 99 | 95 | 99 | 95 | 102 | 93 | 97 | 99 | 92 | 96 | 95 | 102 | 95 | 101 | 90 |
| 94 | 93 | 89 | 86 | 93 | 91 | 90 | 89 | 86 | 83 | 85 | 87 | 74 | 72 | 73 | 71 | 82 |
| 83 | 88 | 90 | 102 | 106 | 111 | 110 | 116 | 118 | 125 | 128 | 126 | 127 | 136 | | | |
| 136 | 136 | 141 | 135 | 142 | 141 | 131 | 130 | 121 | 122 | 129 | 122 | 130 | 125 | 123 | 131 | 125 |
| 131 | 129 | 126 | 131 | 130 | 128 | 128 | 135 | 133 | 129 | 132 | 129 | 127 | 124 | 133 | 127 | 126 |
| 128 | 127 | 129 | 126 | 127 | 127 | 126 | 124 | 124 | 136 | 129 | 129 | 128 | 127 | | | |
| 129 | 134 | 129 | 136 | 135 | 134 | 129 | 130 | 131 | 136 | 136 | 136 | 132 | 132 | 132 | 127 | 131 |
| 134 | 134 | 161 | 181 | 189 | 198 | 201 | 206 | 207 | 206 | 210 | 212 | 213 | 211 | 213 | 215 | 210 |
| 204 | 197 | 183 | 156 | 131 | 96 | 77 | 77 | 71 | 74 | 76 | 83 | 73 | 85 | | | |
| 87 | 89 | 91 | 88 | 90 | 90 | 94 | 93 | 101 | 93 | 88 | 88 | 92 | 96 | 92 | 87 | 94 |
| 93 | 98 | 101 | 92 | 90 | 94 | 90 | 89 | 92 | 94 | 88 | 93 | 88 | 91 | 90 | 95 | 93 |
| 100 | 86 | 93 | 97 | 94 | 97 | 96 | 97 | 93 | 95 | 94 | 94 | 87 | 86 | | | |
| 100 | 92 | 97 | 96 | 95 | 101 | 95 | 97 | 93 | 89 | 101 | 95 | 97 | 97 | 88 | 94 | 82 |
| 91 | 84 | 88 | 89 | 84 | 91 | 93 | 107 | 139 | 144 | 147 | 149 | 148 | 130 | 99 | 137 | 137 |
| 137 | 136 | 138 | 129 | 138 | 134 | 140 | 136 | 135 | 134 | 130 | 139 | 135 | 129 | | | |
| 134 | 131 | 138 | 139 | 127 | 132 | 129 | 134 | 131 | 133 | 130 | 125 | 130 | 129 | 127 | 131 | 127 |
| 134 | 128 | 135 | 133 | 144 | 135 | 142 | 143 | 142 | 143 | 150 | 148 | 154 | 153 | 149 | 149 | 149 |
| 143 | 154 | 145 | 142 | 135 | 133 | 118 | 120 | 127 | 110 | 98 | 82 | 86 | 74 | | | |
| 63 | 65 | 63 | 61 | 55 | 67 | 72 | 66 | 73 | 69 | 73 | 74 | 73 | 73 | 70 | 78 | 80 |
| 76 | 75 | 73 | 72 | 80 | 80 | 78 | 77 | 75 | 75 | 76 | 78 | 78 | 75 | 78 | 78 | 79 |
| 78 | 78 | 73 | 75 | 73 | 75 | 79 | 79 | 89 | 77 | 81 | 86 | 90 | 86 | | | |
| 78 | 89 | 89 | 92 | 85 | 92 | 90 | 92 | 91 | 101 | 97 | 92 | 89 | 94 | 104 | 100 | 101 |
| 96 | 104 | 98 | 96 | 98 | 100 | 95 | 106 | 108 | 102 | 103 | 100 | 100 | 96 | 99 | 104 | 91 |
| 98 | 95 | 105 | 101 | 98 | 101 | 97 | 102 | 97 | 97 | 105 | 104 | 105 | 103 | | | |
| 95 | 102 | 97 | 105 | 102 | 102 | 103 | 103 | 99 | 103 | 96 | 106 | 102 | 99 | 102 | 101 | 106 |
| 100 | 104 | 103 | 101 | 102 | 100 | 100 | 100 | 104 | 108 | 103 | 104 | 99 | 104 | 99 | 105 | 106 |
| 101 | 105 | 105 | 105 | 101 | 109 | 106 | 104 | 102 | 105 | 104 | 105 | 102 | 104 | | | |
| 112 | 102 | 99 | 110 | 104 | 101 | 100 | 102 | 102 | 98 | 100 | 103 | 103 | 99 | 98 | 100 | 101 |
| 97 | 107 | 105 | 104 | 106 | 101 | 100 | 100 | 101 | 99 | 102 | 97 | 98 | 99 | 103 | 105 | 103 |
| 101 | 103 | 101 | 105 | 104 | 109 | 102 | 99 | 102 | 103 | 96 | 96 | 103 | 108 | | | |
| 109 | 114 | 104 | 102 | 102 | 97 | 99 | 97 | 100 | 102 | 98 | 101 | 102 | 102 | 99 | 98 | 99 |
| 97 | 100 | 102 | 93 | 100 | 105 | 105 | 99 | 97 | 96 | 102 | 96 | 101 | 104 | 94 | 95 | 103 |
| 99 | 95 | 99 | 95 | 102 | 93 | 97 | 99 | 92 | 96 | 95 | 102 | 95 | 101 | | | |
| 90 | 94 | 93 | 89 | 86 | 93 | 91 | 90 | 89 | 86 | 83 | 85 | 87 | 74 | 72 | 73 | 71 |

-continued

| | | | | | | | | | | | | | | | | |
|---|---|---|---|---|---|---|---|---|---|---|---|---|---|---|---|---|
| 82 | 83 | 88 | 90 | 102 | 106 | 111 | 110 | 116 | 118 | 125 | 128 | 126 | 127 | 136 | 136 | 136 |
| 141 | 135 | 142 | 141 | 131 | 130 | 121 | 122 | 129 | 122 | 130 | 125 | 123 | 131 | | | |
| 125 | 131 | 129 | 126 | 131 | 130 | 128 | 128 | 135 | 133 | 129 | 132 | 129 | 127 | 124 | 133 | 127 |
| 126 | 128 | 127 | 129 | 126 | 127 | 127 | 126 | 124 | 124 | 136 | 129 | 129 | 128 | 127 | 129 | 134 |
| 129 | 136 | 135 | 134 | 129 | 130 | 131 | 136 | 136 | 136 | 132 | 132 | 132 | 127 | | | |
| 131 | 134 | 134 | 161 | 181 | 189 | 198 | 201 | 206 | 207 | 206 | 210 | 212 | 213 | 211 | 213 | 215 |
| 210 | 204 | 197 | 183 | 156 | 131 | 96 | 77 | 77 | 71 | 74 | 76 | 83 | 73 | 85 | 87 | 89 |
| 91 | 88 | 90 | 90 | 94 | 93 | 101 | 93 | 88 | 88 | 92 | 96 | 92 | 87 | | | |
| 94 | 93 | 98 | 101 | 92 | 90 | 94 | 90 | 89 | 92 | 94 | 88 | 93 | 88 | 91 | 90 | 95 |
| 93 | 100 | 86 | 93 | 97 | 94 | 97 | 96 | 97 | 93 | 95 | 94 | 94 | 87 | 86 | 100 | 92 |
| 97 | 96 | 95 | 101 | 95 | 97 | 93 | 89 | 101 | 95 | 97 | 97 | 88 | 94 | | | |
| 82 | 91 | 84 | 88 | 89 | 84 | 91 | 93 | 107 | 139 | 144 | 147 | 149 | 148 | 130 | 99 | 137 |
| 137 | 137 | 136 | 138 | 129 | 138 | 134 | 140 | 136 | 135 | 134 | 130 | 139 | 135 | 129 | 134 | 131 |
| 138 | 139 | 127 | 132 | 129 | 134 | 131 | 133 | 130 | 125 | 130 | 129 | 127 | 131 | | | |
| 127 | 134 | 128 | 135 | 133 | 144 | 135 | 142 | 143 | 142 | 143 | 150 | 148 | 154 | 153 | 149 | 149 |
| 149 | 143 | 154 | 145 | 142 | 135 | 133 | 118 | 120 | 127 | 110 | 98 | 82 | 86 | 74 | 63 | 65 |
| 63 | 61 | 55 | 67 | 72 | 66 | 73 | 69 | 73 | 74 | 73 | 73 | 70 | 78 | | | |
| 80 | 76 | 75 | 73 | 72 | 80 | 80 | 78 | 77 | 75 | 75 | 76 | 78 | 78 | 75 | 78 | 78 |
| 79 | 78 | 78 | 73 | 75 | 73 | 75 | 79 | 79 | 89 | 77 | 81 | 86 | 90 | 86 | 78 | 89 |
| 89 | 92 | 95 | 92 | 90 | 92 | 91 | 101 | 97 | 92 | 89 | 94 | 104 | 100 | | | |
| 101 | 96 | 104 | 98 | 96 | 98 | 100 | 95 | 106 | 108 | 102 | 103 | 100 | 100 | 96 | 99 | 104 |
| 91 | 98 | 95 | 105 | 101 | 98 | 101 | 97 | 102 | 97 | 97 | 105 | 104 | 105 | 103 | 95 | 102 |
| 97 | 105 | 102 | 102 | 103 | 103 | 99 | 103 | 96 | 106 | 102 | 99 | 102 | 101 | | | |
| 106 | 100 | 104 | 103 | 101 | 102 | 100 | 100 | 100 | 104 | 108 | 103 | 104 | 99 | 104 | 99 | 105 |
| 106 | 101 | 105 | 105 | 105 | 101 | 109 | 106 | 104 | 102 | 105 | 104 | 105 | 102 | 104 | 112 | 102 |
| 99 | 110 | 104 | 101 | 100 | 102 | 102 | 98 | 100 | 103 | 103 | 99 | 98 | 100 | | | |
| 10 | 197 | 107 | 105 | 104 | 106 | 101 | 100 | 100 | 101 | 99 | 102 | 97 | 98 | 99 | 103 | 105 |
| 103 | 101 | 103 | 101 | 105 | 104 | 109 | 102 | 99 | 102 | 103 | 96 | 96 | 103 | 108 | 109 | 114 |
| 104 | 102 | 102 | 97 | 99 | 97 | 100 | 102 | 98 | 101 | 102 | 102 | 99 | 98 | | | |
| 99 | 97 | 100 | 102 | 93 | 100 | 105 | 105 | 99 | 97 | 96 | 102 | 96 | 101 | 104 | 94 | 95 |
| 103 | 99 | 95 | 99 | 95 | 102 | 93 | 97 | 99 | 92 | 96 | 95 | 102 | 95 | 101 | 90 | 94 |
| 93 | 89 | 86 | 93 | 91 | 90 | 89 | 86 | 83 | 85 | 87 | 74 | 72 | 73 | | | |
| 71 | 82 | 83 | 88 | 90 | 102 | 106 | 111 | 110 | 116 | 118 | 125 | 128 | 126 | 127 | 136 | 136 |
| 136 | 141 | 135 | 142 | 141 | 131 | 130 | 121 | 122 | 129 | 122 | 130 | 125 | 123 | 131 | 125 | 131 |
| L29 | 126 | 131 | 130 | 128 | 128 | 135 | 133 | 129 | 132 | 129 | 127 | 124 | 133 | | | |
| 127 | 126 | 128 | 127 | 129 | 126 | 127 | 127 | 126 | 124 | 124 | 136 | 129 | 129 | 128 | 127 | 129 |
| 134 | 129 | 136 | 135 | 134 | 129 | 130 | 131 | 136 | 136 | 136 | 132 | 132 | 132 | 127 | 131 | 134 |
| 134 | 161 | 181 | 189 | 198 | 201 | 206 | 2C7 | 206 | 210 | 212 | 213 | 211 | 213 | | | |
| 215 | 210 | 204 | 197 | 183 | 156 | 131 | 96 | 77 | 77 | 71 | 74 | 76 | 83 | 73 | 85 | 87 |
| 89 | 91 | 88 | 90 | 90 | 94 | 93 | 101 | 93 | 88 | 88 | 92 | 96 | 92 | 87 | 94 | 93 |
| 98 | 101 | 92 | 90 | 94 | 90 | 89 | 92 | 94 | 88 | 93 | 88 | 91 | 90 | | | |
| 95 | 93 | 100 | 86 | 93 | 97 | 94 | 97 | 96 | 97 | 93 | 95 | 94 | 94 | 87 | 86 | 100 |
| 92 | 97 | 96 | 95 | 101 | 95 | 97 | 93 | 89 | 101 | 95 | 97 | 97 | 88 | 94 | 82 | 91 |
| 84 | 88 | 89 | 84 | 91 | 93 | 107 | 139 | 144 | 147 | 149 | 148 | 130 | 99 | | | |
| 137 | 137 | 137 | 136 | 138 | 129 | 138 | 134 | 140 | 136 | 135 | 134 | 130 | 139 | 135 | 129 | 134 |
| 131 | 138 | 139 | 127 | 132 | 129 | 134 | 131 | 133 | 130 | 125 | 130 | 129 | 127 | 131 | 127 | 134 |
| 128 | 135 | 133 | 144 | 135 | 142 | 143 | 142 | 143 | 150 | 148 | 154 | 153 | 149 | | | |
| 149 | 149 | 143 | 154 | 145 | 142 | 135 | 133 | 118 | 120 | 127 | 110 | 98 | 82 | 86 | 74 | 63 |
| 65 | 63 | 61 | 55 | 67 | 72 | 66 | 73 | 69 | 73 | 74 | 73 | 73 | 70 | 78 | 80 | 76 |
| 75 | 73 | 72 | 80 | 80 | 78 | 77 | 75 | 75 | 76 | 78 | 78 | 75 | 78 | | | |
| 78 | 79 | 78 | 78 | 73 | 75 | 73 | 75 | 79 | 79 | 89 | 77 | 81 | 86 | 90 | 86 | 78 |
| 89 | 89 | 92 | 95 | 92 | 90 | 92 | 91 | 101 | 97 | 92 | 89 | 94 | 104 | 100 | 101 | 96 |
| 104 | 98 | 96 | 98 | 100 | 95 | 106 | 108 | 102 | 103 | 100 | 100 | 96 | 99 | | | |
| 104 | 91 | 98 | 95 | 105 | 101 | 98 | 101 | 97 | 102 | 97 | 97 | 105 | 104 | 105 | 103 | 95 |
| 102 | 97 | 105 | 102 | 102 | 103 | 103 | 99 | 103 | 96 | 106 | 102 | 99 | 102 | 101 | 106 | 100 |
| 104 | 103 | 101 | 102 | 100 | 100 | 100 | 104 | 108 | 103 | 104 | 99 | 104 | 99 | | | |
| 105 | 106 | 101 | 105 | 105 | 105 | 101 | 109 | 106 | 104 | 102 | 105 | 104 | 105 | 102 | 104 | 112 |
| 102 | 99 | 110 | 104 | 101 | 100 | 102 | 102 | 98 | 100 | 103 | 103 | 99 | 98 | 100 | 101 | 97 |
| 107 | 105 | 104 | 106 | 101 | 100 | 100 | 101 | 99 | 102 | 97 | 98 | 99 | 103 | | | |
| 105 | 103 | 101 | 103 | 101 | 105 | 104 | 109 | 102 | 99 | 102 | 103 | 96 | 96 | 103 | 108 | 109 |
| 114 | 104 | 102 | 102 | 97 | 99 | 97 | 100 | 102 | 98 | 101 | 102 | 102 | 99 | 98 | 99 | 97 |
| 100 | 102 | 93 | 100 | 105 | 105 | 99 | 97 | 96 | 102 | 96 | 101 | 104 | 94 | | | |
| 95 | 103 | 99 | 95 | 99 | 95 | 102 | 93 | 97 | 99 | 92 | 96 | 95 | 102 | 95 | 101 | 90 |
| 94 | 93 | 89 | 86 | 93 | 91 | 90 | 89 | 86 | 83 | 85 | 87 | 74 | 72 | 73 | 71 | 82 |
| 83 | 88 | 90 | 102 | 106 | 111 | 110 | 116 | 118 | 125 | 128 | 126 | 127 | 136 | | | |
| 136 | 136 | 141 | 135 | 142 | 141 | 131 | 130 | 121 | 122 | 129 | 122 | 130 | 125 | 123 | 131 | 125 |
| 131 | 129 | 126 | 131 | 130 | 128 | 128 | 135 | 133 | 129 | 132 | 129 | 197 | 124 | 133 | 127 | 126 |
| 128 | 127 | 129 | 126 | 127 | 127 | 126 | 124 | 124 | 136 | 129 | 129 | 128 | 127 | | | |
| 129 | 134 | 199 | 136 | 135 | 134 | 129 | 130 | 131 | 136 | 136 | 136 | 132 | 132 | 132 | 127 | 131 |
| 134 | 134 | 161 | 181 | 189 | 198 | 201 | 206 | 207 | 206 | 210 | 212 | 213 | 211 | 213 | 215 | 210 |
| 204 | 197 | 183 | 156 | 131 | 96 | 77 | 77 | 71 | 74 | 76 | 83 | 73 | 85 | | | |
| 87 | 89 | 91 | 88 | 90 | 90 | 94 | 93 | 101 | 93 | 88 | 88 | 92 | 96 | 92 | 87 | 94 |
| 93 | 98 | 101 | 92 | 90 | 94 | 90 | 89 | 92 | 94 | 88 | 93 | 88 | 91 | 90 | 95 | 93 |
| 100 | 86 | 93 | 97 | 94 | 97 | 96 | 97 | 93 | 95 | 34 | 94 | 87 | 86 | | | |
| 100 | 92 | 97 | 96 | 95 | 101 | 95 | 97 | 93 | 89 | 101 | 95 | 97 | 97 | 88 | 94 | 82 |
| 91 | 84 | 88 | 89 | 84 | 91 | 93 | 107 | 139 | 144 | 147 | 149 | 148 | 130 | 99 | 137 | 137 |
| 137 | 136 | 138 | 129 | 138 | 134 | 140 | 136 | 135 | 134 | 130 | 139 | 135 | 129 | | | |
| 134 | 131 | 138 | 139 | 127 | 132 | 129 | 134 | 131 | 133 | 130 | 125 | 130 | 129 | 127 | 131 | 127 |
| 134 | 128 | 135 | 133 | 144 | 135 | 142 | 143 | 142 | 143 | 150 | 148 | 154 | 153 | 149 | 149 | 149 |
| 143 | 154 | 145 | 142 | 135 | 133 | 118 | 120 | 127 | 110 | 98 | 82 | 86 | 74 | | | |
| 63 | 65 | 63 | 61 | 55 | 67 | 72 | 66 | 73 | 69 | 73 | 74 | 73 | 73 | 70 | 78 | 80 |
| 76 | 75 | 73 | 72 | 80 | 80 | 78 | 77 | 75 | 75 | 76 | 78 | 78 | 75 | 78 | 78 | 79 |

-continued

| | | | | | | | | | | | | | | | | |
|---|---|---|---|---|---|---|---|---|---|---|---|---|---|---|---|---|
| 78 | 78 | 73 | 75 | 73 | 75 | 79 | 79 | 89 | 77 | 81 | 86 | 90 | 86 | | | |
| 78 | 89 | 89 | 92 | 95 | 92 | 90 | 92 | 91 | 101 | 97 | 92 | 89 | 94 | 104 | 100 | 101 |
| 96 | 104 | 98 | 96 | 98 | 100 | 95 | 106 | 108 | 102 | 103 | 100 | 100 | 96 | 99 | 104 | 91 |
| 98 | 95 | 105 | 101 | 98 | 101 | 97 | 102 | 97 | 97 | 105 | 104 | 105 | 103 | | | |
| 95 | 102 | 97 | 105 | 102 | 102 | 103 | 103 | 99 | 103 | 96 | 106 | 102 | 99 | 102 | 101 | 106 |
| 100 | 104 | 103 | 101 | 102 | 100 | 100 | 100 | 104 | 108 | 103 | 104 | 99 | 104 | 99 | 105 | 106 |
| 101 | 105 | 105 | 105 | 101 | 109 | 106 | 104 | 102 | 105 | 104 | 105 | 102 | 104 | | | |
| 112 | 102 | 99 | 110 | 104 | 101 | 100 | 102 | 102 | 98 | 100 | 103 | 103 | 99 | 98 | 100 | 101 |
| 97 | 107 | 105 | 104 | 106 | 101 | 100 | 100 | 101 | 99 | 102 | 97 | 98 | 99 | 103 | 105 | 103 |
| 101 | 103 | 101 | 105 | 104 | 109 | 102 | 99 | 102 | 103 | 96 | 96 | 103 | 108 | | | |

Figure 4B:

The picture representing the final image is shown in FIG. 4b.

EXAMPLE 3 (ROTATION OF A PICTURE)

Figure 5:
FIG. 5 represents a processed image of the picture of FIG. 4a, with reference to Example 3.

The object picture is the same as in Example 2. The required operation is the rotation by 90° in the counterclockwise direction (FIG. 5a represents the result of a rotation of the object picture).

The array of the gray levels of the rotated piece S′ of the object picture is the following array 10.

| | | | | | | | | | | | | | | | | |
|---|---|---|---|---|---|---|---|---|---|---|---|---|---|---|---|---|
| 60 | 66 | 75 | 86 | 100 | 117 | 114 | 112 | 111 | 111 | 112 | 114 | 118 | 118 | 118 | 118 | 118 |
| 118 | 118 | 119 | 119 | 117 | 113 | 107 | 92 | 88 | 84 | 81 | 80 | 79 | 68 | 67 | 67 | 66 |
| 65 | 65 | 80 | 84 | 88 | 92 | 95 | 99 | 97 | 97 | 97 | 97 | 97 | 97 | | | |
| 58 | 64 | 73 | 84 | 98 | 115 | 117 | 115 | 114 | 114 | 115 | 117 | 118 | 118 | 118 | 118 | 118 |
| 118 | 117 | 118 | 117 | 114 | 110 | 104 | 90 | 67 | 85 | 83 | 83 | 83 | 75 | 74 | 73 | 73 |
| 72 | 71 | 80 | 83 | 86 | 90 | 93 | 96 | 97 | 97 | 97 | 97 | 97 | 97 | | | |
| 56 | 62 | 71 | 82 | 96 | 113 | 119 | 118 | 117 | 117 | 118 | 119 | 118 | 118 | 118 | 118 | 118 |
| 118 | 116 | 117 | 115 | 112 | 107 | 101 | 88 | 86 | 85 | 85 | 86 | 88 | 81 | 81 | 80 | 79 |
| 79 | 78 | 80 | 83 | 86 | 89 | 91 | 94 | 97 | 97 | 97 | 97 | 97 | 97 | | | |
| 56 | 62 | 70 | 82 | 96 | 112 | 122 | 120 | 119 | 119 | 120 | 122 | 118 | 118 | 118 | 118 | 118 |
| 118 | 115 | 115 | 114 | 110 | 105 | 98 | 86 | 86 | 86 | 87 | 90 | 93 | 88 | 87 | 87 | 86 |
| 85 | 85 | 81 | 83 | 86 | 88 | 91 | 93 | 97 | 97 | 97 | 97 | 97 | 97 | | | |
| 56 | 62 | 71 | 82 | 96 | 113 | 125 | 123 | 122 | 122 | 123 | 125 | 118 | 118 | 118 | 118 | 118 |
| 118 | 114 | 114 | 112 | 108 | 102 | 94 | 84 | 85 | 87 | 89 | 93 | 97 | 95 | 94 | 93 | 93 |
| 92 | 91 | 83 | 85 | 87 | 89 | 91 | 93 | 97 | 97 | 97 | 97 | 97 | 97 | | | |
| 57 | 63 | 72 | 83 | 97 | 114 | 127 | 126 | 125 | 125 | 126 | 127 | 118 | 118 | 118 | 118 | 118 |
| 118 | 114 | 113 | 110 | 106 | 99 | 91 | 82 | 84 | 87 | 91 | 96 | 102 | 101 | 101 | 100 | 99 |
| 99 | 98 | 86 | 87 | 89 | 91 | 92 | 94 | 97 | 97 | 97 | 97 | 97 | 97 | | | |
| 50 | 60 | 31 | 82 | 95 | 109 | 132 | 131 | 130 | 128 | 124 | 120 | 125 | 122 | 119 | 117 | 114 |
| 111 | 109 | 105 | 100 | 95 | 91 | 86 | 94 | 89 | 86 | 86 | 89 | 94 | 95 | 101 | 108 | 106 |
| 104 | 100 | 100 | 99 | 97 | 96 | 95 | 93 | 96 | 97 | 98 | 98 | 99 | 100 | | | |
| 48 | 58 | 68 | 80 | 92 | 105 | 130 | 130 | 130 | 128 | 126 | 123 | 124 | 121 | 118 | 116 | 113 |
| 110 | 108 | 103 | 98 | 94 | 89 | 84 | 89 | 80 | 73 | 69 | 68 | 69 | 93 | 100 | 104 | 105 |
| 104 | 100 | 100 | 99 | 98 | 96 | 95 | 94 | 94 | 95 | 96 | 96 | 97 | 98 | | | |
| 48 | 57 | 67 | 78 | 90 | 102 | 128 | 130 | 130 | 130 | 128 | 126 | 25 | 122 | 119 | 117 | 114 |
| 111 | 107 | 102 | 97 | 93 | 88 | 83 | 88 | 74 | 64 | 56 | 50 | 48 | 92 | 99 | 103 | 105 |
| 104 | 100 | 100 | 99 | 97 | 96 | 95 | 93 | 92 | 93 | 94 | 94 | 95 | 96 | | | |
| 48 | 57 | 67 | 77 | 88 | 101 | 128 | 130 | 132 | 132 | 132 | 130 | 127 | 125 | 122 | 119 | 117 |
| 114 | 107 | 102 | 97 | 93 | 88 | 83 | 90 | 72 | 58 | 46 | 36 | 30 | 90 | 97 | 102 | 104 |
| 104 | 101 | 99 | 97 | 96 | 95 | 93 | 92 | 90 | 91 | 92 | 92 | 93 | 94 | | | |
| 50 | 58 | 67 | 77 | 88 | 100 | 129 | 132 | 134 | 136 | 136 | 136 | 132 | 129 | 126 | 124 | 121 |
| 118 | 108 | 103 | 98 | 94 | 89 | 84 | 95 | 74 | 55 | 39 | 26 | 15 | 88 | 96 | 101 | 104 |
| 104 | 101 | 96 | 95 | 94 | 92 | 91 | 90 | 89 | 89 | 90 | 90 | 91 | 92 | | | |
| 52 | 60 | 68 | 78 | 88 | 100 | 130 | 134 | 138 | 140 | 141 | 142 | 138 | 135 | 133 | 130 | 127 |
| 125 | 109 | 105 | 100 | 95 | 91 | 86 | 104 | 79 | 56 | 36 | 19 | 4 | 86 | 95 | 100 | 104 |
| 104 | 102 | 93 | 92 | 91 | 89 | 88 | 87 | 86 | 87 | 88 | 83 | 89 | 90 | | | |
| 61 | 65 | 70 | 77 | 87 | 97 | 112 | 140 | 158 | 168 | 168 | 160 | 157 | 152 | 147 | 141 | 136 |
| 131 | 125 | 114 | 106 | 99 | 94 | 91 | 105 | 83 | 66 | 53 | 44 | 40 | 97 | 103 | 107 | 108 |
| 107 | 102 | 88 | 86 | 34 | 84 | 84 | 85 | 86 | 87 | 87 | 88 | 89 | 89 | | | |
| 65 | 69 | 75 | 82 | 91 | 102 | 126 | 154 | 173 | 183 | 184 | 176 | 180 | 175 | 170 | 166 | 161 |
| 156 | 144 | 131 | 120 | 111 | 103 | 97 | 105 | 85 | 70 | 59 | 53 | 51 | 97 | 103 | 106 | 107 |
| 105 | 100 | 88 | 86 | 84 | 84 | 84 | 85 | 82 | 83 | 84 | 84 | 85 | 86 | | | |
| 69 | 73 | 78 | 85 | 95 | 105 | 136 | 164 | 183 | 194 | 195 | 188 | 195 | 190 | 186 | 182 | 178 |
| 173 | 158 | 142 | 129 | 117 | 106 | 98 | 102 | 84 | 71 | 63 | 59 | 59 | 96 | 102 | 105 | 105 |
| 103 | 97 | 88 | 86 | 84 | 84 | 84 | 85 | 81 | 81 | 82 | 83 | 83 | 84 | | | |
| 71 | 75 | 81 | 88 | 97 | 108 | 140 | 169 | 189 | 200 | 202 | 195 | 201 | 198 | 194 | 190 | 186 |
| 183 | 167 | 148 | 132 | 117 | 104 | 93 | 96 | 81 | 70 | 64 | 62 | 65 | 95 | 100 | 102 | 102 |
| 99 | 94 | 88 | 86 | 84 | 84 | 84 | 85 | 81 | 81 | 82 | 83 | 83 | 84 | | | |
| 73 | 77 | 83 | 90 | 99 | 110 | 141 | 170 | 190 | 202 | 204 | 198 | 200 | 197 | 194 | 190 | 187 |
| 184 | 170 | 149 | 130 | 113 | 97 | 83 | 88 | 75 | 67 | 63 | 63 | 68 | 92 | 97 | 99 | 98 |
| 95 | 89 | 88 | 86 | 84 | 84 | 84 | 85 | 82 | 83 | 84 | 84 | 85 | 86 | | | |
| 74 | 78 | 83 | 91 | 100 | 111 | 137 | 166 | 187 | 199 | 202 | 196 | 191 | 188 | 185 | 183 | 180 |
| 177 | 168 | 144 | 123 | 103 | 84 | 68 | 77 | 66 | 60 | 58 | 61 | 68 | 89 | 93 | 95 | 94 |
| 90 | 83 | 88 | 86 | 84 | 84 | 84 | 87 | 87 | 88 | 89 | 89 | | | | | |
| 83 | 86 | 93 | 103 | 117 | 134 | 181 | 189 | 190 | 186 | 175 | 158 | 174 | 169 | 165 | 161 | 157 |
| 152 | 116 | 119 | 116 | 105 | 87 | 62 | 73 | 67 | 65 | 66 | 71 | 80 | 78 | 31 | 83 | 86 |
| 89 | 91 | 92 | 91 | 89 | 88 | 87 | 86 | 90 | 90 | 91 | 92 | 92 | 93 | | | |
| 80 | 84 | 91 | 102 | 116 | 134 | 169 | 178 | 181 | 178 | 168 | 152 | 161 | 158 | 155 | 151 | 148 |
| 145 | 124 | 128 | 124 | 114 | 96 | 71 | 74 | 68 | 66 | 67 | 72 | 80 | 77 | 80 | 83 | 85 |
| 88 | 91 | 94 | 93 | 92 | 92 | 91 | 90 | 92 | 93 | 94 | 94 | 95 | 96 | | | |
| 76 | 80 | 87 | 98 | 113 | 131 | 161 | 172 | 176 | 174 | 166 | 151 | 157 | 155 | 152 | 150 | 147 |

-continued

| | | | | | | | | | | | | | | | | |
|---|---|---|---|---|---|---|---|---|---|---|---|---|---|---|---|---|
| 145 | 136 | 139 | 136 | 125 | 107 | 82 | 76 | 70 | 68 | 69 | 74 | 82 | 79 | 82 | 85 | 87 |
| 90 | 93 | 97 | 97 | 97 | 97 | 97 | 96 | 98 | 98 | 99 | 100 | 100 | 101 | | | |
| 69 | 74 | 82 | 93 | 108 | 123 | 158 | 170 | 175 | 174 | 168 | 154 | 161 | 159 | 158 | 156 | 155 |
| 153 | 150 | 153 | 150 | 139 | 121 | 96 | 78 | 72 | 70 | 72 | 76 | 85 | 84 | 87 | 89 | 92 |
| 95 | 97 | 103 | 103 | 103 | 104 | 104 | 104 | 106 | 106 | 107 | 108 | 108 | 109 | | | |
| 61 | 66 | 74 | 86 | 102 | 121 | 159 | 172 | 179 | 180 | 174 | 162 | 173 | 172 | 171 | 171 | 170 |
| 169 | 166 | 170 | 166 | 156 | 138 | 113 | 82 | 76 | 74 | 75 | 80 | 88 | 91 | 94 | 97 | 99 |
| 102 | 105 | 110 | 111 | 112 | 112 | 113 | 114 | 116 | 117 | 118 | 118 | 119 | 120 | | | |
| 51 | 56 | 65 | 78 | 94 | 113 | 164 | 179 | 187 | 189 | 185 | 174 | 192 | 193 | 193 | 193 | 193 |
| 194 | 186 | 189 | 186 | 175 | 157 | 132 | 86 | 80 | 78 | 80 | 84 | 93 | 101 | 104 | 107 | 109 |
| 112 | 115 | 119 | 121 | 122 | 123 | 124 | 125 | 130 | 130 | 131 | 132 | 132 | 133 | | | |
| 55 | 48 | 50 | 61 | 81 | 110 | 126 | 156 | 179 | 193 | 200 | 198 | 191 | 191 | 191 | 190 | 188 |
| 185 | 188 | 187 | 184 | 178 | 169 | 158 | 88 | 82 | 80 | 81 | 86 | 94 | 111 | 118 | 123 | 127 |
| 128 | 128 | 129 | 130 | 132 | 133 | 134 | 136 | 142 | 144 | 146 | 148 | 150 | 152 | | | |
| 63 | 55 | 56 | 66 | 85 | 113 | 127 | 156 | 177 | 189 | 194 | 191 | 787 | 188 | 188 | 188 | 186 |
| 184 | 185 | 186 | 184 | 179 | 172 | 162 | 104 | 98 | 96 | 97 | 102 | 110 | 126 | 133 | 138 | 141 |
| 143 | 143 | 139 | 140 | 141 | 143 | 144 | 145 | 161 | 163 | 165 | 167 | 169 | 171 | | | |
| 70 | 62 | 62 | 71 | 89 | 116 | 130 | 156 | 175 | 186 | 189 | 184 | 183 | 185 | 185 | 183 | 184 |
| 182 | 182 | 184 | 184 | 180 | 174 | 166 | 121 | 115 | 123 | 114 | 119 | 128 | 141 | 148 | 153 | 156 |
| 158 | 157 | 152 | 153 | 154 | 156 | 157 | 158 | 178 | 180 | 182 | 184 | 186 | 188 | | | |
| 78 | 68 | 68 | 76 | 93 | 119 | 133 | 158 | 175 | 184 | 185 | 178 | 179 | 181 | 182 | 183 | 182 |
| 180 | 178 | 182 | 184 | 180 | 176 | 168 | 139 | 133 | 131 | 132 | 137 | 146 | 155 | 162 | 167 | 171 |
| 172 | 172 | 168 | 170 | 171 | 172 | 174 | 175 | 192 | 194 | 196 | 198 | 200 | 202 | | | |
| 85 | 74 | 73 | 81 | 97 | 122 | 137 | 160 | 175 | 183 | 182 | 173 | 176 | 178 | 180 | 180 | 180 |
| 179 | 173 | 178 | 180 | 179 | 176 | 170 | 158 | 152 | 150 | 151 | 156 | 164 | 170 | 177 | 182 | 185 |
| 187 | 187 | 189 | 190 | 191 | 193 | 194 | 195 | 203 | 205 | 207 | 209 | 211 | 213 | | | |
| 93 | 82 | 79 | 86 | 101 | 125 | 142 | 163 | 177 | 182 | 180 | 169 | 172 | 175 | 177 | 178 | 178 |
| 177 | 168 | 174 | 177 | 176 | 171 | 178 | 172 | 170 | 171 | 176 | 184 | 185 | 192 | 197 | 200 |
| 202 | 201 | 212 | 214 | 215 | 216 | 218 | 219 | 212 | 214 | 216 | 218 | 220 | 222 | | | |
| 83 | 74 | 73 | 78 | 91 | 111 | 153 | 156 | 158 | 160 | 101 | 160 | 150 | 151 | 152 | 152 | 153 |
| 154 | 151 | 152 | 152 | 153 | 154 | 154 | 160 | 166 | 173 | 179 | 185 | 192 | 187 | 198 | 207 | 214 |
| 219 | 223 | 221 | 221 | 220 | 220 | 220 | 220 | 230 | 227 | 224 | 221 | 217 | 214 | | | |
| 83 | 72 | 68 | 72 | 82 | 100 | 130 | 134 | 137 | 139 | 140 | 140 | 141 | 142 | 143 | 143 | 144 |
| 145 | 144 | 145 | 146 | 146 | 147 | 148 | 152 | 157 | 162 | 166 | 171 | 176 | 196 | 206 | 214 | 221 |
| 226 | 229 | 226 | 225 | 224 | 224 | 223 | 222 | 214 | 211 | 208 | 206 | 203 | 200 | | | |
| 87 | 74 | 68 | 69 | 78 | 93 | 113 | 117 | 121 | 123 | 125 | 125 | 133 | 134 | 134 | 135 | 136 |
| 136 | 138 | 138 | 139 | 140 | 141 | 146 | 149 | 152 | 155 | 157 | 160 | 192 | 202 | 210 | 216 |
| 220 | 223 | 219 | 218 | 217 | 216 | 215 | 213 | 196 | 193 | 191 | 189 | 187 | 185 | | | |
| 96 | 81 | 73 | 72 | 78 | 91 | 101 | 106 | 110 | 173 | 115 | 116 | 126 | 126 | 127 | 128 | 128 |
| 129 | 131 | 132 | 132 | 133 | 134 | 134 | 140 | 141 | 143 | 144 | 145 | 146 | 176 | 185 | 193 | 198 |
| 202 | 205 | 201 | 199 | 198 | 196 | 195 | 193 | 176 | 174 | 172 | 171 | 169 | 167 | | | |
| 110 | 92 | 82 | 78 | 82 | 93 | 95 | 100 | 104 | 108 | 110 | 112 | 119 | 120 | 121 | 121 | 122 |
| 123 | 124 | 125 | 126 | 126 | 127 | 128 | 136 | 135 | 134 | 134 | 133 | 132 | 147 | 156 | 163 | 168 |
| 172 | 174 | 171 | 169 | 167 | 165 | 163 | 161 | 154 | 153 | 152 | 150 | 149 | 148 | | | |
| 127 | 108 | 95 | 89 | 91 | 100 | 94 | 99 | 104 | 108 | 1Z3 | 114 | 114 | 115 | 116 | 116 |
| 117 | 118 | 118 | 119 | 120 | 120 | 121 | 132 | 129 | Z27 | 125 | 122 | 120 | 106 | 114 | 121 | 126 |
| 129 | 130 | 130 | 127 | 125 | 122 | 120 | 117 | 131 | 130 | 129 | 128 | 127 | 127 | | | |
| 124 | 119 | 113 | 107 | 100 | 91 | 104 | 105 | 107 | 109 | 111 | 112 | 112 | 112 | 112 | 112 | 112 |
| 112 | 121 | 122 | 122 | 123 | 124 | 124 | 121 | 120 | 119 | 118 | 117 | 116 | 118 | 118 | 118 | 118 |
| 118 | 118 | 119 | 124 | 128 | 131 | 133 | 134 | 135 | 136 | 136 | 137 | 138 | 138 | | | |
| 120 | 120 | 119 | 117 | 114 | 110 | 105 | 106 | 107 | 109 | 110 | 111 | 114 | 114 | 114 | 114 | 114 |
| 114 | 118 | 119 | 120 | 120 | 121 | 122 | 119 | 118 | 117 | 117 | 116 | 115 | 118 | 118 | 118 | 118 |
| 118 | 118 | 119 | 123 | 127 | 129 | 131 | 132 | 132 | 133 | 134 | 134 | 135 | 136 | | | |
| 108 | 112 | 116 | 118 | 120 | 120 | 106 | 107 | 108 | 109 | 110 | 114 | 114 | 114 | 114 | 114 |
| 114 | 116 | 116 | 117 | 118 | 118 | 119 | 116 | 116 | 116 | 116 | 115 | 115 | 118 | 118 | 118 | 118 |
| 118 | 118 | 118 | 122 | 125 | 128 | 129 | 129 | 130 | 130 | 131 | 132 | 132 | 133 | | | |
| 87 | 96 | 103 | 110 | 116 | 121 | 107 | 107 | 108 | 108 | 109 | 109 | 112 | 112 | 112 | 112 | 112 |
| 112 | 113 | 114 | 114 | 115 | 116 | 116 | 114 | 114 | 114 | 114 | 115 | 115 | 118 | 118 | 118 | 118 |
| 118 | 118 | 118 | 122 | 124 | 126 | 127 | 127 | 127 | 128 | 128 | 129 | 130 | 130 | | | |
| 57 | 70 | 82 | 94 | 104 | 114 | 108 | 108 | 108 | 108 | 108 | 108 | 108 | 108 | 108 | 108 | 108 |
| 108 | 110 | 111 | 112 | 112 | 113 | 114 | 111 | 112 | 113 | 113 | 114 | 115 | 118 | 118 | 118 | 118 |
| 118 | 118 | 118 | 121 | 123 | 125 | 125 | 125 | 124 | 125 | 126 | 126 | 127 | 128 | | | |
| 18 | 36 | 52 | 68 | 83 | 97 | 109 | 109 | 108 | 108 | 107 | 107 | 102 | 102 | 102 | 102 | 102 |
| 102 | 108 | 108 | 109 | 110 | 110 | 111 | 109 | 110 | 111 | 112 | 113 | 114 | 118 | 118 | 118 | 118 |
| 118 | 118 | 118 | 120 | 122 | 123 | 123 | 122 | 122 | 122 | 123 | 124 | 124 | 125 | | | |
| 20 | 20 | 21 | 23 | 25 | 29 | 72 | 82 | 92 | 102 | 111 | 121 | 108 | 106 | 103 | 101 | 98 |
| 96 | 102 | 102 | 103 | 104 | 104 | 105 | 107 | 109 | 110 | 110 | 109 | 107 | 113 | 112 | 112 | 113 |
| 115 | 118 | 121 | 121 | 121 | 121 | 121 | 121 | 115 | 115 | 115 | 115 | 115 | 115 | | | |
| 20 | 20 | 20 | 22 | 24 | 27 | 50 | 58 | 66 | 74 | 82 | 90 | 104 | 105 | 106 | 106 | 107 |
| 108 | 100 | 101 | 102 | 102 | 103 | 104 | 106 | 108 | 109 | 109 | 108 | 106 | 111 | 110 | 110 | 110 |
| 112 | 114 | 118 | 118 | 118 | 118 | 118 | 118 | 114 | 114 | 114 | 114 | 114 | 114 | | | |
| 21 | 20 | 20 | 21 | 23 | 25 | 33 | 39 | 46 | 52 | 58 | 64 | 93 | 96 | 100 | 104 | 108 |
| 111 | 99 | 100 | 100 | 101 | 102 | 102 | 104 | 106 | 107 | 107 | 106 | 104 | 110 | 108 | 107 | 108 |
| 109 | 111 | 115 | 115 | 115 | 115 | 115 | 115 | 113 | 113 | 113 | 113 | 113 | 113 | | | |
| 21 | 20 | 20 | 20 | 21 | 24 | 22 | 26 | 30 | 35 | 39 | 44 | 73 | 80 | 87 | 93 | 100 |
| 107 | 98 | 98 | 99 | 100 | 100 | 101 | 102 | 104 | 104 | 104 | 104 | 102 | 108 | 106 | 105 | 105 |
| 105 | 107 | 111 | 111 | 111 | 111 | 111 | 111 | 111 | 111 | 111 | 111 | 111 | 111 | | | |
| 22 | 20 | 19 | 19 | 20 | 22 | 15 | 18 | 21 | 23 | 26 | 29 | 45 | 55 | 65 | 75 | 85 |
| 95 | 96 | 97 | 98 | 98 | 99 | 100 | 98 | 100 | 101 | 101 | 100 | 98 | 106 | 104 | 102 | 102 |
| 102 | 103 | 108 | 108 | 108 | 108 | 108 | 108 | 110 | 110 | 110 | 110 | 110 | 110 | | | |
| 22 | 20 | 19 | 18 | 19 | 20 | 14 | 15 | 16 | 17 | 18 | 19 | 9 | 22 | 35 | 49 | 62 |
| 75 | 95 | 96 | 96 | 97 | 98 | 98 | 94 | 96 | 96 | 96 | 96 | 94 | 105 | 102 | 100 | 99 |

| | | | | | |
|---|---|---|---|---|---|
| 99 | 99 | 105 | 105 | 105 | 105 | 105 | 105 | 109 | 109 | 109 | 109 | 109 | 109 |

The above rotation acts on the Taylor polynomials, representing the intermediate image, obtained in the Example 2, as follows: let the 6×6 pixel square segments, into which the original picture has been subdivided, be indexed by two indices i and j, in such a way that the middle segment has indices 0,0. Denote the Taylor polynomial corresponding to the segment i, j by $p_{ij}$. Then:

a. The indices i, j of each $p_{ij}$ are replaced by $-j, i$ b. x is replaced by y, and y by $-x$.

Using the notation already used in discussing processing, $F(p_{ij}(x,y)) = p_{-j,i}(y, -x)$.

The result of the application of the corresponding subroutine to the Taylor polynomials in the intermediate range, obtained in the Example 2, is the intermediate range of the rotated picture. Its part P′ corresponding to the rotated piece S′, is the following array 11.

| | | | | | |
|---|---|---|---|---|---|
| 0.29296875 | −0.0078125 | 0.0078125 | 0.015625 | −0.000000 | 0.015625 |
| 0.45703125 | 0.0312500 | −0.0312500 | 0.000000 | −0.000000 | 0.000000 |
| 0.45703125 | 0.0000000 | −0.0000000 | 0.000000 | −0.000000 | 0.000000 |
| 0.43750000 | −0.0234375 | 0.0234375 | 0.000000 | −0.015625 | 0.000000 |
| 0.33203125 | 0.0156250 | −0.0156250 | 0.000000 | 0.046875 | 0.000000 |
| 0.32031250 | 0.0781250 | −0.0781250 | 0.000000 | −0.000000 | 0.000000 |
| 0.33593750 | 0.0000000 | −0.0000000 | 0.015625 | −0.015625 | 0.015625 |
| 0.37500000 | 0.0000000 | −0.0000000 | 0.000000 | −0.000000 | 0.000000 |
| 0.27734375 | −0.0078125 | 0.0078125 | 0.015625 | −0.015625 | 0.015625 |
| 0.51171875 | 0.0234375 | −0.0234375 | 0.015625 | 0.031250 | 0.015625 |
| 0.46093750 | 0.0312500 | −0.0312500 | 0.031250 | −0.000000 | 0.031250 |
| 0.36718750 | 0.0000000 | −0.0000000 | 0.015625 | −0.000000 | 0.015625 |
| 0.21093750 | −0.0937500 | 0.0937500 | 0.062500 | −0.140625 | 0.062500 |
| 0.40234375 | −0.0078125 | 0.0078125 | 0.000000 | 0.015625 | 0.000000 |
| 0.37109375 | −0.0156250 | 0.0156250 | −0.015625 | −0.000000 | −0.015625 |
| 0.35937500 | −0.0234375 | 0.0234375 | 0.000000 | −0.000000 | 0.000000 |
| 0.32031250 | 0.0312500 | −0.0312500 | −0.015625 | −0.000000 | −0.015625 |
| 0.75390625 | 0.0703125 | −0.0703125 | −0.078125 | 0.015625 | −0.078125 |
| 0.73828125 | 0.0937500 | −0.0937500 | −0.140625 | 0.015625 | −0.140625 |
| 0.48437500 | 0.0234375 | −0.0234375 | −0.093750 | −0.093750 | −0.093750 |
| 0.25781250 | 0.0000000 | −0.0000000 | −0.046895 | 0.078125 | −0.046875 |
| 0.40234375 | −0.0312500 | 0.0312500 | −0.015625 | −0.015625 | −0.015625 |
| 0.32421875 | 0.0000000 | −0.0000000 | 0.000000 | −0.000000 | 0.000000 |
| 0.31640625 | 0.0000000 | −0.0000000 | 0.031250 | −0.000000 | 0.031250 |
| 0.34765625 | −0.0625000 | 0.0625000 | −0.031250 | 0.015625 | −0.031250 |
| 0.68359375 | 0.0000000 | −0.0000000 | 0.078125 | 0.046875 | 0.078125 |
| 0.50765625 | 0.0703125 | −0.0703125 | 0.140625 | 0.031250 | 0.140625 |
| 0.53906250 | 0.1640625 | −0.1640625 | 0.046875 | −0.000000 | 0.046875 |
| 0.26562500 | 0.0312500 | −0.0312500 | 0.015625 | −0.000000 | 0.015625 |
| 0.33984375 | 0.0546875 | −0.0546875 | 0.046875 | −0.000000 | 0.046875 |
| 0.38671875 | 0.0781250 | −0.0781250 | 0.031250 | 0.015625 | 0.031250 |
| 0.39843750 | 0.0937500 | −0.0937500 | 0.046875 | −0.000000 | 0.046875 |
| 0.26171875 | 0.0625000 | −0.0625000 | 0.000000 | −0.031250 | 0.000000 |
| 0.70703125 | −0.0156250 | 0.0156250 | 0.015625 | −0.062500 | 0.015625 |
| 0.71875000 | −0.0312500 | 0.0312500 | 0.000000 | 0.015625 | 0.000000 |
| 0.71093750 | −0.0078125 | 0.0078125 | −0.015625 | 0.046875 | −0.015625 |
| 0.47656250 | 0.2109375 | −0.2109375 | 0.015625 | −0.000000 | 0.015625 |
| 0.63281250 | 0.1718750 | −0.1718750 | 0.000000 | −0.000000 | 0.000000 |
| 0.63671875 | 0.1953125 | −0.1953125 | 0.062500 | −0.000000 | 0.062500 |
| 0.74218750 | 0.1640625 | −0.1640625 | −0.046875 | −0.000000 | −0.046875 |
| 0.26562500 | 0.0390625 | −0.0390625 | 0.078125 | −0.078125 | 0.078125 |
| 0.44921875 | −0.1250000 | 0.1250000 | 0.093750 | 0.015625 | 0.093750 |
| 0.51171875 | −0.0859375 | 0.0859375 | 0.015625 | −0.000000 | 0.015625 |
| 0.53125000 | −0.0781250 | 0.0781250 | 0.000000 | −0.000000 | 0.000000 |
| 0.57812500 | −0.1171875 | 0.1171875 | 0.015625 | −0.062500 | 0.015625 |
| 0.80468750 | −0.2031250 | 0.2031250 | −0.218750 | −0.015625 | −0.218750 |
| 0.81250000 | −0.2265625 | 0.2265625 | −0.203125 | −0.015625 | −0.203125 |
| 0.70703125 | −0.2187500 | 0.2187500 | −0.031250 | 0.015625 | −0.031250 |
| 0.43750000 | −0.1171875 | 0.1171875 | −0.156250 | 0.156250 | −0.156250 |
| 0.41796875 | 0.0000000 | −0.0000000 | 0.000000 | −0.015625 | 0.000000 |
| 0.43750000 | −0.0234375 | 0.0234375 | −0.031250 | −0.000000 | −0.031250 |
| 0.44921875 | −0.0312500 | 0.0312500 | 0.000000 | −0.000000 | 0.000000 |
| 0.44531250 | −0.0156250 | 0.0156250 | 0.000000 | 0.015625 | 0.000000 |
| 0.45703125 | 0.0000000 | −0.0000000 | 0.000000 | −0.000000 | 0.000000 |
| 0.49218750 | −0.0156250 | 0.0156250 | 0.000000 | −0.015625 | 0.000000 |
| 0.50781250 | −0.0312500 | 0.0312500 | 0.000000 | −0.000000 | 0.000000 |
| 0.07421875 | −0.0078125 | 0.0078125 | 0.000000 | −0.015625 | 0.000000 |
| 0.15234375 | −0.1875000 | 0.1875000 | 0.093750 | −0.062500 | 0.093750 |
| 0.37500000 | −0.1406250 | 0.1406250 | −0.140625 | 0.109375 | −0.140625 |
| 0.38671875 | −0.0156250 | 0.0156250 | 0.000000 | −0.000000 | 0.000000 |
| 0.41015625 | −0.0312500 | 0.0319500 | −0.015625 | −0.000000 | −0.015625 |
| 0.41015625 | −0.0312500 | 0.0312500 | 0.000000 | −0.015625 | 0.000000 |
| 0.43750000 | −0.0390625 | 0.0390625 | 0.000000 | −0.000000 | 0.000000 |
| 0.43359375 | −0.0156250 | 0.0156250 | 0.000000 | −0.000000 | 0.000000 |

The final image, produced from the data rotated in a compressed form, is shown in FIG. 5b.

EXAMPLE 4 (PRODUCING A NEGATIVE PICTURE)

The object picture is the same as in the Example 2. It is required to produce a negative of this picture. Under this operation each gray level value z must be replaced by $z'=255-z$.

Figure 6A:
FIGS. 6a and 6b represent the negative of the picture of FIG. 4a and its image, respectively, with reference to Example 4.

The negative of the original picture is shown in FIG. 6a. The array S″ of the gray levels, corresponding to the negative of the piece S, is the following.

| | | | | | | | | | | | | | | | | |
|---|---|---|---|---|---|---|---|---|---|---|---|---|---|---|---|---|
| 158 | 158 | 158 | 158 | 158 | 158 | 155 | 157 | 159 | 161 | 163 | 165 | 166 | 169 | 171 | 171 | 169 |
| 166 | 162 | 159 | 154 | 146 | 135 | 122 | 103 | 84 | 67 | 53 | 42 | 33 | 41 | 55 | 70 | 88 |
| 107 | 128 | 117 | 119 | 122 | 125 | 127 | 130 | 140 | 741 | 142 | 144 | 145 | 146 | | | |
| 158 | 158 | 158 | 158 | 158 | 158 | 156 | 158 | 160 | 162 | 164 | 166 | 166 | 170 | 172 | 172 | 170 |
| 166 | 163 | 160 | 155 | 147 | 136 | 123 | 105 | 86 | 69 | 55 | 44 | 35 | 38 | 52 | 68 | 86 |
| 106 | 128 | 117 | 120 | 123 | 125 | 128 | 131 | 140 | 141 | 142 | 144 | 145 | 146 | | | |
| 258 | 158 | 158 | 158 | 158 | 158 | 157 | 159 | 161 | 163 | 165 | 167 | 167 | 171 | 172 | 172 | 171 |
| 167 | 163 | 161 | 155 | 147 | 137 | 123 | 107 | 88 | 71 | 57 | 46 | 37 | 34 | 49 | 66 | 84 |
| 105 | 127 | 118 | 121 | 123 | 126 | 129 | 131 | 140 | 141 | 142 | 144 | 145 | 146 | | | |
| 158 | 158 | 158 | 158 | 158 | 158 | 157 | 159 | 161 | 163 | 165 | 167 | 168 | 171 | 173 | 173 | 171 |
| 168 | 164 | 161 | 156 | 148 | 137 | 124 | 109 | 90 | 73 | 59 | 48 | 39 | 31 | 47 | 64 | 83 |
| 103 | 126 | 119 | 121 | 124 | 127 | 129 | 132 | 140 | 141 | 142 | 144 | 145 | 146 | | | |
| 158 | 158 | 158 | 158 | 158 | 158 | 158 | 160 | 162 | 164 | 166 | 168 | 168 | 172 | 174 | 174 | 172 |
| 168 | 165 | 162 | 157 | 149 | 138 | 125 | 111 | 92 | 75 | 61 | 50 | 41 | 28 | 44 | 62 | 81 |
| 102 | 125 | 119 | 122 | 125 | 127 | 130 | 133 | 140 | 141 | 142 | 144 | 145 | 146 | | | |
| 158 | 138 | 158 | 158 | 158 | 158 | 159 | 161 | 163 | 165 | 167 | 169 | 169 | 173 | 174 | 174 | 173 |
| 169 | 165 | 163 | 157 | 149 | 139 | 125 | 113 | 94 | 77 | 63 | 52 | 43 | 25 | 41 | 59 | 79 |
| 101 | 124 | 120 | 123 | 125 | 128 | 131 | 133 | 140 | 141 | 142 | 144 | 145 | 146 | | | |
| 156 | 159 | 161 | 162 | 162 | 161 | 162 | 161 | 162 | 163 | 165 | 168 | 170 | 170 | 170 | 170 | 170 |
| 170 | 169 | 165 | 159 | 151 | 141 | 130 | 119 | 110 | 97 | 80 | 60 | 36 | 35 | 33 | 42 | 62 |
| 94 | 138 | 121 | 123 | 126 | 128 | 130 | 133 | 134 | 137 | 140 | 144 | 147 | 150 | | | |
| 160 | 162 | 164 | 164 | 164 | 163 | 160 | 160 | 160 | 162 | 164 | 107 | 171 | 171 | 171 | 171 | 171 |
| 171 | 168 | 164 | 158 | 151 | 142 | 131 | 121 | 111 | 98 | 81 | 61 | 37 | 35 | 32 | 40 | 60 |
| 92 | 135 | 122 | 124 | 126 | 128 | 130 | 132 | 134 | 137 | 140 | 144 | 147 | 150 | | | |
| 163 | 165 | 166 | 167 | 166 | 164 | 159 | 159 | 159 | 160 | 163 | 166 | 171 | 171 | 171 | 171 | 171 |
| 171 | 167 | 163 | 158 | 151 | 143 | 132 | 129 | 112 | 99 | 83 | 62 | 39 | 35 | 31 | 39 | 59 |
| 90 | 133 | 124 | 126 | 127 | 129 | 130 | 132 | 137 | 137 | 140 | 144 | 147 | 150 | | | |
| 167 | 169 | 169 | 169 | 168 | 166 | 158 | 157 | 158 | 159 | 161 | 164 | 171 | 171 | 171 | 171 | 171 |
| 171 | 166 | 163 | 158 | 152 | 143 | 133 | 173 | 114 | 101 | 84 | 64 | 40 | 35 | 31 | 38 | 57 |
| 88 | 130 | 127 | 128 | 130 | 131 | 132 | 133 | 134 | 137 | 140 | 144 | 147 | 150 | | | |
| 171 | 172 | 172 | 172 | 170 | 168 | 156 | 156 | 156 | 158 | 160 | 163 | 169 | 169 | 169 | 169 | 169 |
| 169 | 164 | 162 | 158 | 152 | 144 | 134 | 125 | 115 | 102 | 85 | 65 | 41 | 34 | 30 | 37 | 56 |
| 86 | 128 | 131 | 132 | 133 | 133 | 134 | 335 | 134 | 137 | 140 | 144 | 147 | 150 | | | |
| 175 | 175 | 175 | 174 | 172 | 169 | 155 | 155 | 155 | 156 | 159 | 162 | 167 | 167 | 167 | 167 | 167 |
| 167 | 163 | 161 | 158 | 152 | 145 | 136 | 126 | 116 | 103 | 87 | 66 | 43 | 34 | 29 | 36 | 54 |
| 84 | 125 | 136 | 136 | 137 | 137 | 137 | 137 | 134 | 137 | 140 | 144 | 147 | 150 | | | |
| 190 | 184 | 177 | 170 | 164 | 157 | 155 | 155 | 155 | 154 | 154 | 153 | 153 | 155 | 158 | 161 | 166 |
| 172 | 164 | 164 | 162 | 158 | 150 | 140 | 127 | 112 | 98 | 83 | 68 | 54 | 32 | 26 | 32 | 50 |
| 81 | 125 | 137 | 137 | 137 | 137 | 137 | 137 | 137 | 141 | 144 | 148 | 152 | 156 | | | |
| 190 | 183 | 176 | 170 | 163 | 156 | 151 | 151 | 151 | 151 | 151 | 151 | 448 | 150 | 152 | 156 | 160 |
| 165 | 166 | 167 | 165 | 160 | 153 | 143 | 127 | 112 | 97 | 83 | 68 | 53 | 36 | 29 | 35 | 53 |
| 83 | 126 | 137 | 137 | 137 | 137 | 137 | 137 | 140 | 143 | 146 | 150 | 153 | 156 | | | |
| 189 | 182 | 176 | 169 | 162 | 156 | 149 | 150 | 150 | 151 | 151 | 151 | 147 | 148 | 150 | 153 | 157 |
| 161 | 169 | 170 | 168 | 163 | 156 | 146 | 128 | 114 | 99 | 84 | 70 | 55 | 41 | 34 | 39 | 57 |
| 87 | 129 | 137 | 137 | 137 | 137 | 137 | 137 | 142 | 145 | 147 | 150 | 153 | 156 | | | |
| 188 | 182 | 175 | 168 | 162 | 155 | 150 | 151 | 152 | 153 | 154 | 155 | 148 | 149 | 150 | 153 | 156 |
| 160 | 172 | 172 | 170 | 166 | 158 | 148 | 132 | 117 | 102 | 88 | 73 | 58 | 48 | 41 | 45 | 62 |
| 92 | 134 | 137 | 137 | 137 | 137 | 137 | 137 | 143 | 145 | 148 | 150 | 153 | 155 | | | |
| 188 | 181 | 174 | 168 | 161 | 154 | 154 | 155 | 156 | 158 | 159 | 160 | 152 | 152 | 153 | 155 | 158 |
| 162 | 174 | 175 | 173 | 168 | 161 | 151 | 137 | 122 | 107 | 93 | 78 | 63 | 57 | 49 | 53 | 70 |
| 99 | 141 | 137 | 137 | 137 | 137 | 137 | 137 | 143 | 145 | 147 | 149 | 151 | 153 | | | |
| 187 | 180 | 174 | 167 | 160 | 154 | 160 | 162 | 163 | 165 | 167 | 169 | 158 | 158 | 159 | 160 | 163 |
| 166 | 177 | 178 | 176 | 171 | 164 | 154 | 144 | 129 | 114 | 100 | 85 | 70 | 68 | 59 | 63 | 79 |
| 108 | 149 | 137 | 137 | 137 | 137 | 137 | 142 | 144 | 145 | 147 | 149 | 150 | | | | |
| 176 | 172 | 167 | 162 | 158 | 153 | 161 | 186 | 207 | 225 | 240 | 251 | 215 | 204 | 196 | 190 | 187 |
| 187 | 175 | 175 | 173 | 170 | 167 | 162 | 161 | 145 | 127 | 109 | 91 | 71 | 63 | 79 | 95 | 109 |
| 123 | 135 | 139 | 140 | 140 | 140 | 140 | 141 | 148 | 149 | 151 | 153 | 157 | 161 | | | |
| 175 | 172 | 169 | 165 | 162 | 159 | 166 | 187 | 205 | 219 | 229 | 236 | 211 | 202 | 196 | 193 | 192 |
| 194 | 184 | 183 | 181 | 179 | 175 | 171 | 169 | 153 | 136 | 118 | 99 | 79 | 70 | 84 | 98 | 110 |
| 122 | 133 | 138 | 139 | 140 | 140 | 141 | 142 | 146 | 147 | 149 | 151 | 155 | 159 | | | |
| 174 | 172 | 170 | 168 | 166 | 164 | 269 | 186 | 199 | 209 | 216 | 219 | 202 | 196 | 192 | 191 | 192 |
| 197 | 189 | 188 | 186 | 183 | 180 | 175 | 174 | 158 | 141 | 123 | 104 | 84 | 76 | 89 | 100 | 111 |
| 121 | 130 | 137 | 138 | 139 | 141 | 142 | 143 | 145 | 146 | 148 | 151 | 154 | 159 | | | |
| 171 | 170 | 170 | 169 | 168 | 168 | 169 | 182 | 191 | 197 | 200 | 199 | 189 | 185 | 184 | 185 | 188 |
| 195 | 190 | 189 | 187 | 185 | 181 | 177 | 175 | 159 | 142 | 124 | 105 | 85 | 82 | 93 | 103 | 112 |
| 121 | 128 | 136 | 138 | 139 | 141 | 142 | 144 | 145 | 146 | 148 | 151 | 154 | 159 | | | |
| 167 | 168 | 169 | 169 | 170 | 171 | 166 | 175 | 181 | 183 | 181 | 176 | 172 | 170 | 171 | 174 | 180 |
| 189 | 188 | 187 | 185 | 183 | 179 | 175 | 173 | 157 | 140 | 122 | 103 | 83 | 89 | 98 | 106 | 114 |
| 120 | 126 | 135 | 137 | 139 | 141 | 143 | 145 | 146 | 147 | 149 | 151 | 155 | 159 | | | |
| 163 | 165 | 167 | 169 | 171 | 173 | 161 | 166 | 167 | 165 | 160 | 151 | 150 | 150 | 153 | 159 | 167 |
| 178 | 182 | 181 | 179 | 177 | 173 | 169 | 167 | 151 | 134 | 116 | 97 | 77 | 95 | 103 | 109 | 115 |
| 119 | 123 | 134 | 136 | 139 | 141 | 144 | 146 | 148 | 149 | 151 | 153 | 157 | 161 | | | |
| 148 | 151 | 154 | 157 | 161 | 164 | 169 | 171 | 172 | 172 | 171 | 169 | 164 | 158 | 157 | 162 | 172 |
| 187 | 193 | 184 | 173 | 159 | 142 | 123 | 97 | 93 | 89 | 87 | 85 | 84 | 101 | 107 | 114 | 121 |

-continued

| | | | | | | | | | | | | | | | |
|---|---|---|---|---|---|---|---|---|---|---|---|---|---|---|---|
| 127 | 134 | 131 | 133 | 136 | 139 | 141 | 144 | 150 | 151 | 153 | 154 | 155 | 157 | | |
| 142 | 145 | 148 | 150 | 153 | 156 | 164 | 166 | 167 | 167 | 166 | 164 | 161 | 152 | 149 | 151 | 158 |
| 171 | 168 | 159 | 148 | 134 | 117 | 98 | 86 | 83 | 81 | 79 | 79 | 79 | 101 | 108 | 115 | 121 |
| 128 | 135 | 131 | 134 | 137 | 139 | 142 | 145 | 151 | 152 | 153 | 155 | 156 | 157 | | |
| 138 | 141 | 143 | 145 | 147 | 149 | 160 | 161 | 162 | 162 | 161 | 160 | 156 | 144 | 138 | 138 | 142 |
| 152 | 150 | 141 | 130 | 116 | 99 | 80 | 77 | 76 | 35 | 75 | 76 | 77 | 102 | 109 | 115 | 122 |
| 129 | 135 | 132 | 135 | 137 | 140 | 143 | 145 | 151 | 153 | 154 | 155 | 157 | 158 | | |
| 136 | 138 | 140 | 141 | 143 | 145 | 155 | 157 | 158 | 158 | 157 | 155 | 149 | 135 | 126 | 123 | 125 |
| 132 | 139 | 131 | 119 | 105 | 89 | 69 | 71 | 71 | 71 | 73 | 75 | 78 | 103 | 109 | 116 | 123 |
| 129 | 136 | 133 | 135 | 138 | 141 | 143 | 146 | 152 | 153 | 155 | 156 | 157 | 159 | | |
| 136 | 137 | 138 | 140 | 141 | 142 | 150 | 152 | 153 | 153 | 152 | 150 | 141 | 124 | 113 | 107 | 106 |
| 111 | 136 | 127 | 116 | 102 | 85 | 66 | 68 | 69 | 71 | 73 | 77 | 81 | 103 | 110 | 117 | 123 |
| 130 | 137 | 133 | 136 | 139 | 141 | 144 | 147 | 153 | 154 | 155 | 157 | 158 | 159 | | |
| 137 | 138 | 139 | 140 | 141 | 141 | 1L6 | 147 | 148 | 148 | 147 | 146 | 130 | 111 | 97 | 88 | 85 |
| 87 | 139 | 131 | 119 | 105 | 89 | 69 | 67 | 70 | 73 | 77 | 82 | 87 | 104 | 111 | 117 | 124 |
| 131 | 137 | 134 | 137 | 139 | 142 | 145 | 147 | 153 | 155 | 156 | 157 | 159 | 160 | | |
| 137 | 137 | 137 | 137 | 137 | 137 | 144 | 145 | 144 | 141 | 137 | 130 | 124 | 99 | 82 | 72 | 71 |
| 78 | 103 | 110 | 110 | 102 | 86 | 61 | 70 | 71 | 73 | 75 | 76 | 78 | 101 | 110 | 119 | 126 |
| 132 | 138 | 143 | 141 | 141 | 143 | 147 | 153 | 159 | 147 | 144 | 148 | 160 | 180 | | |
| 137 | 137 | 137 | 137 | 137 | 137 | 141 | 142 | 141 | 138 | 134 | 128 | 119 | 94 | 77 | 69 | 68 |
| 75 | 98 | 107 | 108 | 100 | 85 | 62 | 67 | 69 | 71 | 73 | 75 | 77 | 102 | 111 | 119 | 127 |
| 133 | 139 | 143 | 141 | 141 | 143 | 147 | 153 | 157 | 148 | 147 | 155 | 170 | 193 | | |
| 137 | 137 | 137 | 137 | 137 | 137 | 138 | 139 | 138 | 136 | 131 | 125 | 114 | 89 | 73 | 65 | 65 |
| 72 | 94 | 104 | 105 | 99 | 84 | 62 | 65 | 67 | 70 | 72 | 75 | 77 | 103 | 112 | 120 | 127 |
| 134 | 139 | 143 | 141 | 141 | 143 | 147 | 153 | 154 | 149 | 151 | 162 | 180 | 206 | | |
| 137 | 137 | 137 | 137 | 137 | 137 | 136 | 137 | 136 | 133 | 129 | 122 | 108 | 85 | 68 | 61 | 61 |
| 70 | 90 | 100 | 103 | 97 | 84 | 62 | 64 | 67 | 70 | 73 | 75 | 78 | 103 | 112 | 123 | 128 |
| 134 | 140 | 143 | 141 | 141 | 143 | 147 | 153 | 152 | 149 | 155 | 168 | 190 | 220 | | |
| 137 | 137 | 137 | 137 | 137 | 137 | 133 | 134 | 133 | 130 | 126 | 120 | 103 | 80 | 65 | 57 | 58 |
| 67 | 86 | 97 | 100 | 96 | 83 | 62 | 64 | 67 | 70 | 74 | 77 | 80 | 104 | 113 | 121 | 129 |
| 135 | 141 | 143 | 141 | 141 | 143 | 147 | 153 | 149 | 150 | 159 | 175 | 200 | 233 | | |
| 137 | 137 | 137 | 137 | 137 | 137 | 130 | 131 | 130 | 128 | 123 | 117 | 98 | 75 | 150 | 54 | 55 |
| 64 | 81 | 94 | 98 | 94 | 82 | 63 | 64 | 68 | 72 | 76 | 79 | 83 | 105 | 114 | 122 | 129 |
| 136 | 141 | 143 | 141 | 141 | 143 | 147 | 153 | 147 | 151 | 162 | 182 | 210 | 246 | | |
| 141 | 138 | 136 | 133 | 130 | 128 | 135 | 132 | 129 | 125 | 119 | 113 | 95 | 79 | 67 | 60 | 57 |
| 59 | 97 | 103 | 104 | 101 | 93 | 81 | 57 | 64 | 71 | 77 | 82 | 86 | 95 | 115 | 130 | 139 |
| 143 | 142 | 143 | 144 | 145 | 146 | 147 | 148 | 134 | 165 | 191 | 211 | 226 | 236 | | |
| 143 | 140 | 137 | 135 | 132 | 129 | 131 | 129 | 127 | 123 | 119 | 114 | 87 | 71 | 60 | 53 | 51 |
| 53 | 80 | 87 | 89 | 87 | 81 | 70 | 55 | 61 | 66 | 70 | 73 | 75 | 94 | 115 | 130 | 140 |
| 145 | 144 | 144 | 145 | 146 | 146 | 147 | 148 | 144 | 173 | 197 | 216 | 229 | 237 | | |
| 144 | 141 | 138 | 136 | 133 | 130 | 127 | 127 | 125 | 123 | 119 | 115 | 87 | 72 | 61 | 55 | 53 |
| 56 | 69 | 77 | 81 | 81 | 75 | 66 | 62 | 66 | 69 | 71 | 72 | 73 | 95 | 116 | 132 | 142 |
| 147 | 147 | 146 | 146 | 147 | 147 | 147 | 147 | 153 | 181 | 203 | 220 | 232 | 238 | | |
| 144 | 141 | 138 | 136 | 133 | 130 | 125 | 125 | 125 | 123 | 121 | 117 | 97 | 82 | 72 | 66 | 65 |
| 68 | 65 | 74 | 79 | 80 | 76 | 68 | 76 | 78 | 80 | 80 | 80 | 78 | 97 | 118 | 134 | 145 |
| 151 | 151 | 148 | 148 | 147 | 147 | 141 | 147 | 163 | 189 | 209 | 225 | 234 | 239 | | |
| 143 | 140 | 137 | 135 | 132 | 129 | 124 | 125 | 125 | 125 | 123 | 121 | 115 | 101 | 81 | 86 | 85 |
| 89 | 66 | 77 | 83 | 85 | 83 | 76 | 99 | 99 | 99 | 97 | 95 | 92 | 99 | 121 | 138 | 149 |
| 155 | 156 | 150 | 149 | 148 | 148 | 147 | 146 | 173 | 197 | 216 | 229 | 237 | 240 | | |
| 141 | 138 | 136 | 133 | 130 | 128 | 123 | 125 | 127 | 127 | 126 | 125 | 143 | 129 | 119 | 115 | 114 |
| 118 | .74 | 86 | 94 | 97 | 96 | 91 | 129 | 128 | 125 | 122 | 118 | 113 | 102 | 125 | 142 | 154 |
| 160 | 161 | 151 | 150 | 149 | 148 | 147 | 146 | 183 | 205 | 222 | 233 | 240 | 241 | | |
| 138 | 140 | 142 | 143 | 142 | 141 | 146 | 150 | 153 | 154 | 155 | 155 | 158 | 153 | 150 | 147 | 145 |
| 144 | 121 | 121 | 124 | 128 | 134 | 142 | 145 | 142 | 139 | 136 | 133 | 130 | 144 | 155 | 162 | 164 |
| 162 | 155 | 164 | 145 | 135 | 134 | 141 | 158 | 226 | 228 | 230 | 231 | 233 | 235 | | |
| 155 | 157 | 159 | 159 | 159 | 158 | 160 | 163 | 165 | 167 | 167 | 167 | 168 | 164 | 160 | 158 | 156 |
| 155 | 138 | 134 | 142 | 147 | 153 | 161 | 174 | 170 | 166 | 162 | 158 | 154 | 164 | 173 | 177 | 177 |
| 173 | 164 | 155 | 141 | 135 | 139 | 151 | 172 | 230 | 231 | 232 | 234 | 235 | 236 | | |
| 169 | 171 | 173 | 173 | 173 | 172 | 173 | 175 | 177 | 178 | 178 | 177 | 178 | 173 | 170 | 167 | 165 |
| 164 | 152 | 153 | 157 | 162 | 169 | 177 | 194 | 189 | 184 | 179 | 174 | 169 | 177 | 183 | 186 | 183 |
| 177 | 166 | 148 | 138 | 137 | 145 | 161 | 187 | 232 | 233 | 234 | 235 | 236 | 237 | | |
| 180 | 182 | 184 | 185 | 184 | 183 | 184 | 187 | 188 | 188 | 188 | 187 | 185 | 180 | 177 | 174 | 172 |
| 172 | 162 | 164 | 168 | 173 | 181 | 190 | 205 | 199 | 193 | 187 | 182 | 176 | 182 | 167 | 187 | 182 |
| 173 | 160 | 142 | 136 | 139 | 152 | 173 | 203 | 234 | 235 | 235 | 235 | 236 | 236 | | |
| 189 | 191 | 193 | 193 | 193 | 192 | 195 | 197 | 198 | 198 | 199 | 195 | 190 | 186 | 182 | 180 | 178 |
| 177 | 169 | 171 | 175 | 181 | 189 | 199 | 207 | 200 | 193 | 187 | 180 | 173 | 181 | 133 | 181 | 174 |
| 163 | 147 | 136 | 135 | 143 | 159 | 185 | 219 | 235 | 235 | 235 | 235 | 235 | 235 | | |
| 195 | 197 | 199 | 199 | 199 | 198 | 205 | 207 | 207 | 207 | 205 | 203 | 194 | 190 | 186 | 184 | 182 |
| 181 | 172 | 175 | 179 | 186 | 194 | 204 | 200 | 192 | 185 | 177 | 170 | 162 | 172 | 172 | 168 | 159 |
| 145 | 128 | 131 | 135 | 147 | 168 | 198 | 237 | 235 | 235 | 234 | 234 | 233 | 233 | | |

The above operation on Taylor polynomials is the following:

$$F(a_0+a_1x+a_2y+a_{11}x^2+2a_{12}xy+a_{22}y^2)=1-a_0-a_1x-a_2y-a_{11}a^2-2a_{12}xy-a_{22}y^2$$

(in the same rescaling as above).

The corresponding subroutine, applied to the Taylor polynomials of the intermediate image obtained in the Example 2, gives the intermediate image of the negative. The part of the polynomials array P", corresponding to the piece S" of the negative, is the following.

| 0.62500000 | −0.0000000 | −0.0000000 | −0.000000 | −0.000000 | −0.000000 |
|---|---|---|---|---|---|

-continued

| | | | | | |
|---|---|---|---|---|---|
| 0.64062500 | 0.0078125 | 0.0234375 | −0.000000 | −0.000000 | −0.000000 |
| 0.68359375 | 0.0078125 | −0.0000000 | −0.000000 | −0.000000 | −0.031250 |
| 0.60156250 | 0.0078125 | −0.0937500 | −0.000000 | −0.000000 | −0.046875 |
| 0.25781250 | 0.0234375 | −0.1640625 | −0.000000 | −0.000000 | 0.046875 |
| 0.29296875 | −0.0234375 | 0.2187500 | −0.000000 | 0.015625 | 0.031250 |
| 0.49218750 | 0.0078125 | 0.0312500 | −0.000000 | −0.000000 | −0.000000 |
| 0.56640625 | −0.0000000 | 0.0156250 | −0.000000 | −0.000000 | −0.000000 |
| 0.66406250 | 0.0312500 | −0.0000000 | −0.000000 | −0.015625 | −0.015625 |
| 0.62890625 | −0.0156250 | 0.0156250 | −0.000000 | −0.000000 | 0.015625 |
| 0.67578125 | −0.0078125 | −0.0000000 | −0.015625 | −0.000000 | −0.000000 |
| 0.61328125 | −0.0000000 | −0.0781250 | −0.000000 | 0.015625 | −0.031250 |
| 0.36328125 | 0.0156250 | −0.1953125 | −0.000000 | −0.000000 | −0.062500 |
| 0.18750000 | −0.0156250 | 0.2265625 | −0.000000 | −0.015625 | 0.203125 |
| 0.50781250 | 0.0234375 | 0.0156250 | 0.015625 | 0.015625 | −0.000000 |
| 0.56250000 | −0.0000000 | 0.0390625 | −0.000000 | −0.000000 | −0.000000 |
| 0.67968750 | −0.0078125 | −0.0781250 | −0.000000 | −0.000000 | −0.000000 |
| 0.59765625 | 0.0234375 | 0.0078125 | 0.046875 | 0.015625 | −0.000000 |
| 0159765625 | −0.0000000 | 0.0312500 | 0.046875 | −0.015625 | 0.015625 |
| 0.66015625 | 0.0312500 | −0.0546875 | −0.000000 | −0.000000 | −0.046875 |
| 0.36718750 | 0.0390625 | −0.1718750 | 0.031250 | −0.000000 | −0.000000 |
| 0.19531250 | 0.0703125 | 0.2031250 | 0.031250 | −0.015625 | 0.218750 |
| 0.54296875 | −0.0000000 | −0.0000000 | −0.000000 | −0.000000 | −0.000000 |
| 0.58984375 | −0.0000000 | 0.0312500 | −0.015625 | −0.015625 | −0.000000 |
| 0.66796875 | 0.0078125 | −0.0156250 | −0.015625 | 0.046875 | −0.000000 |
| 0.78906250 | −0.1171875 | 0.0937500 | −0.046875 | −0.140625 | −0.062500 |
| 0.74218150 | −0.0859375 | −0.0000000 | −0.078125 | 0.078125 | 0.046875 |
| 0.73437500 | 0.0156250 | −0.0312500 | −0.062500 | −0.000000 | −0.015625 |
| 0.52343750 | 0.0156250 | −0.2109375 | −0.062500 | −0.000000 | −0.015625 |
| 0.42187500 | 0.0234375 | 0.1171875 | −0.000000 | −0.062500 | −0.015625 |
| 0.55468750 | −0.0000000 | 0.0156250 | −0.000000 | 0.015625 | −0.000000 |
| 0.58984375 | −0.0000000 | 0.0312500 | 0.015625 | −0.000000 | 0.015625 |
| 0.56250000 | −0.0390625 | 0.0234375 | 0.031250 | −0.015625 | −0.000000 |
| 0.63281250 | −0.0546875 | −0.0000000 | −0.000000 | −0.000000 | −0.015625 |
| 0.51562500 | −0.1562500 | −0.0234375 | −0.031250 | −0.093750 | 0.093750 |
| 0.46093750 | −0.1250000 | −0.1640625 | 0.125000 | −0.000000 | −0.046875 |
| 0.28906250 | −0.0312500 | 0.0078125 | 0.046875 | 0.046875 | 0.015625 |
| 0.46875000 | 0.0078125 | 0.0781250 | −0.000000 | −0.000000 | −0.000000 |
| 0.55078125 | 0.0078125 | 0.0312500 | −0.000000 | −0.000000 | −0.000000 |
| 0.61328125 | 0.0078125 | 0.0156250 | −0.000000 | −0.000000 | −0.000000 |
| 0.54296875 | −0.0000000 | −0.0000000 | −0.000000 | −0.000000 | −0.000000 |
| 0.53906250 | −0.0312500 | −0.0312500 | −0.000000 | −0.000000 | −0.031250 |
| 0.26171875 | −0.0468750 | −0.0937500 | −0.000000 | 0.015625 | 0.140625 |
| 0.40234375 | −0.0234375 | −0.0703125 | −0.000000 | 0.031250 | −0.140625 |
| 0.28125000 | −0.0000000 | 0.0312500 | 0.015625 | 0.015625 | −0.000000 |
| 0.48828125 | 0.0078125 | 0.0859375 | −0.000000 | −0.000000 | −0.015625 |
| 0.56250000 | −0.0000000 | 0.0234375 | −0.000000 | −0.000000 | 0.031250 |
| 0.62500000 | 0.0625000 | 0.1406250 | −0.000000 | 0.109375 | 0.140625 |
| 0.54296875 | −0.0000000 | −0.0312500 | −0.015625 | −0.000000 | −0.000000 |
| 0.48828125 | −0.0000000 | −0.0234375 | 0.015625 | 0.031250 | −0.015625 |
| 0.24609375 | 0.1250000 | −0.0703125 | 0.156250 | 0.015625 | 0.078125 |
| 0.31640625 | −0.0156250 | −0.0000000 | 0.109375 | 0.046875 | −0.078125 |
| 0.29296875 | 0.1171875 | 0.0156250 | 0.140625 | −0.062500 | −0.015625 |
| 0.55078125 | 0.0312500 | 0.1250000 | 0.015625 | 0.015625 | −0.093750 |
| 0.58203125 | 0.0078125 | −0.0000000 | −0.000000 | −0.015625 | −0.000000 |
| 0.84765625 | 0.0625000 | 0.1875000 | −0.000000 | −0.062500 | −0.093750 |
| 0.70703125 | 0.1328125 | 0.0078125 | −0.046875 | −0.000000 | −0.015625 |
| 0.72265625 | 0.1250000 | 0.0078125 | −0.015625 | −0.015625 | −0.015625 |
| 0.67968750 | 0.0859375 | −0.0312500 | −0.031250 | −0.000000 | 0.015625 |
| 0.65234375 | 0.1326125 | 0.0625000 | −0.062500 | 0.015625 | 0.031250 |
| 0.73828125 | 0.1015625 | −0.0625000 | −0.156250 | −0.031250 | −0.000000 |
| 0.73437500 | −0.0000000 | −0.0390625 | −0.125000 | −0.078125 | −0.078125 |
| 0.56250000 | 0.0546875 | 0.1171875 | 0.015625 | 0.156250 | 0.156250 |
| 0.92578125 | 0.0078125 | 0.0078125 | −0.015625 | −0.015625 | −0.000000 |

Figure 6B:

The final image produced from the intermediate negative image, obtained as above, is shown in FIG. 6b.

While a number of embodiments of the invention have been discussed and illustrated, it will be understood that the invention may be carried out in a number of ways and with many modifications, adaptations, and variations, by persons skilled in the art, without departing from its spirit and from the scope of the appended claims.

We claim:

1. Process for the production of a compressed image of a static or dynamic color picture, comprising the steps of:

(a) optical scanning said picture to form color corresponding to its basic colors including at least one color selected from the group consisting of magenta, cyan and yellow at all of the coordinate points of said picture;

(b) transforming said color values into an array of digital values;

(c) selecting from said array of digital values, sets of values representing a series of elements of said picture having discontinuities therein;

(d) storing said sets of values within a computer or other electronic storage device;

(e) for each of said elements of said picture, formulating a model, with said model having a first component incorporating the discontinuities of said element and a second component representing the differentiable content of said element, with said second component defined by Taylor polynomials having multiple coefficients;

(f) selecting a maximum allowable error for the model to establish a given precision for the image to be produced;

(g) defining a grid for said picture divided into different regions having multiple grid points and a grid pitch h determined by $CMh^{k+1} \leq \epsilon$, wherein $C=1/(k+1)!$ and M is the maximum at each grid point of the absolute value of the derivatives of the grid $k+1$ of the differential component or components of the model;

(h) selecting the degree of Taylor polynomials equal to at least two;

(i) using a computer to derive from said models of said elements of said picture, an array of data values constituting a compressed image of said original picture based upon the selection of the degree of said polynomials and the maximum allowable error for said models with the coefficients of said Taylor polynomials computed along grid points for approximating the differentiable component of said models;

(j) storing in said computer, the values and parameters defining the first component of said models and the computed coefficients for the Taylor polynomials as the array of data values constituting a compressed image of the original picture;

(k) deriving from said array of optical data values corresponding for each of the identifiable coordinate points; and (l) generating from said optical values, a color picture which is the compressed image of said original picture.

2. Process according to claim 1, wherein the grid is a square grid having a pitch of 6 pixels.

3. Process according to claim 1, wherein said picture has the form:

$$\Phi(x) = Hx_0, a, b, c, d(x) \div \phi(x)$$

wherein H is defined by $H(x)=a(x-x_0)+b$, if $x \geq x_0$ or $H(x)=c(x-x_0)+d$, if x is less than $x_0$.

4. Process according to claim 1, wherein said picture is a differentiable function of another function which embodies the non-differentiable characteristics of the object.

5. Process according to claim 1, further comprising constructing an adjusted image by applying to each differentiable component a Whitney subroutine, and minimizing the quantity W thus computed, under such constraints that the results of the minimization do not deviate from the initial data by more than the allowed error.

6. Process according to claim 1, further comprising rounding off the coefficients of said Taylor polynomial to a maximum allowable error greater than said maximum allowable error $\Sigma$.

7. Process according to claim 1, further comprising the steps of constructing another grid which is sparser than said grid with a pitch determined by the resolution required by the lowest fineness of said components, deriving a second array of data values constituting a temporary compressed image of said picture; subtracting the data values of said temporary image from the data values of said original image to obtain a residual image, and repeating the same steps for successively finer components, correspondingly obtaining successive residual images at increasingly higher resolutions.

8. Process according to claim 1, further comprising applying an encoding method to the coefficients of said Taylor polynomials.

9. Process according to claim 1, further comprising constructing a final compressed image by a procedure comprising the steps of dividing the domain in which the possibly image has been defined, into possibly overlapping regions by means of a grid with each region being a portion of the grid around a grid node, and constructing curves representing the Taylor polynomials of degree k from a coefficients defining the temporary image at each grid node.

10. Process according to claim 1, further comprising processing the data values defining the image of said picture for an intermediate image by applying an operator thereto.

11. A process as claimed in claim 1, wherein said maximum allowable error equals 5, said degree k of said polynomial equals 2 and said pitch h of said grid equals 6.

12. Process as claimed in claim 1, wherein said second component of said model is defined by minimizing a quantity representing the deviation from said array of digital values consisting of said first and second components.

* * * * *